United States Patent
Light et al.

(10) Patent No.: US 11,200,323 B2
(45) Date of Patent: Dec. 14, 2021

(54) SYSTEMS AND METHODS FOR FORECASTING CYBERSECURITY RATINGS BASED ON EVENT-RATE SCENARIOS

(71) Applicant: BitSight Technologies, Inc., Boston, MA (US)

(72) Inventors: Marc Noel Light, Somerville, MA (US); Liwei Lin, Herndon, VA (US); Thomas Erhardt Montroy, Cambridge, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

(21) Appl. No.: 16/360,641

(22) Filed: Mar. 21, 2019

(65) Prior Publication Data

US 2020/0125734 A1 Apr. 23, 2020

Related U.S. Application Data

(63) Continuation-in-part of application No. 29/666,942, filed on Oct. 17, 2018.

(51) Int. Cl.
*G06F 21/57* (2013.01)
*G06F 17/18* (2006.01)
*H04L 29/06* (2006.01)

(52) U.S. Cl.
CPC ............ *G06F 21/577* (2013.01); *G06F 17/18* (2013.01); *H04L 63/1433* (2013.01); *G06F 2221/034* (2013.01)

(58) Field of Classification Search
CPC .. G06F 21/577; G06F 17/18; G06F 2221/034; H04L 63/1433
See application file for complete search history.

(56) References Cited

U.S. PATENT DOCUMENTS 5,867,799 A   2/1999 Lang et al.
6,016,475 A   1/2000 Miller et al.
(Continued)

FOREIGN PATENT DOCUMENTS

CA   3015146 A1   8/2017
WO   2017/142694 A1   8/2017
WO   2019/023045 A1   1/2019

OTHER PUBLICATIONS

Gilgur, A., Gunn, S., Browning, D., et al. (2015). Percentile-Based Approach to Forecasting Workload Growth Proceedings of CMG'15 Performance and Capacity International Conference by the Computer Measurement Group. Nov. 2015 (Year: 2015).*
(Continued)

*Primary Examiner* — Michael R Vaughan
(74) *Attorney, Agent, or Firm* — Goodwin Procter LLP

(57) ABSTRACT

Disclosed herein are computer-implemented methods and systems for forecasting security ratings for an entity. The methods and systems can include generating a plurality of simulated instantiations of a security scenario for the entity, in which the security scenario characterized by a plurality of security events associated with at least one event type. The methods and systems can further include determining a security rating for each instantiation of the plurality of instantiations; and generating a forecast cone based on the determined security ratings for the plurality of instantiations. In some examples, for each event type of the at least one event type, the methods and systems can include determining a rate, duration, and/or temporal placement of the security events associated with the event type over a forecasting period.

24 Claims, 9 Drawing Sheets

(56) References Cited

U.S. PATENT DOCUMENTS

| | | | |
|---|---|---|---|
| 6,745,150 B1 * | 6/2004 | Breiman | G06Q 10/06 702/181 |
| 6,792,401 B1 | 9/2004 | Nigro et al. | |
| 7,062,572 B1 | 6/2006 | Hampton | |
| D525,264 S | 7/2006 | Chotai et al. | |
| D525,629 S | 7/2006 | Chotai et al. | |
| 7,100,195 B1 | 8/2006 | Underwood | |
| 7,194,769 B2 | 3/2007 | Lippmann et al. | |
| 7,290,275 B2 | 10/2007 | Baudoin et al. | |
| D604,740 S | 11/2009 | Matheny et al. | |
| 7,650,570 B2 | 1/2010 | Torrens et al. | |
| 7,747,778 B1 | 6/2010 | King et al. | |
| 7,748,038 B2 | 6/2010 | Olivier et al. | |
| 7,827,607 B2 | 11/2010 | Sobel et al. | |
| D630,645 S | 1/2011 | Tokunaga et al. | |
| 7,971,252 B2 | 6/2011 | Lippmann et al. | |
| D652,048 S | 1/2012 | Joseph | |
| D667,022 S | 9/2012 | LoBosco et al. | |
| 8,370,933 B1 | 2/2013 | Buckler | |
| 8,429,630 B2 | 4/2013 | Nickolov et al. | |
| D682,287 S | 5/2013 | Cong et al. | |
| D688,260 S | 8/2013 | Pearcy et al. | |
| 8,504,556 B1 | 8/2013 | Rice et al. | |
| D691,164 S | 10/2013 | Lim et al. | |
| D694,252 S | 11/2013 | Helm | |
| D694,253 S | 11/2013 | Helm | |
| 8,621,621 B1 | 12/2013 | Burns et al. | |
| 8,661,146 B2 | 2/2014 | Alex et al. | |
| D700,616 S | 3/2014 | Chao | |
| 8,677,481 B1 | 3/2014 | Lee | |
| 8,775,402 B2 | 7/2014 | Baskerville et al. | |
| 8,825,662 B1 | 9/2014 | Kingman et al. | |
| D730,918 S | 6/2015 | Park et al. | |
| 9,053,210 B2 | 6/2015 | Elnikety et al. | |
| 9,075,990 B1 | 7/2015 | Yang | |
| D740,847 S | 10/2015 | Yampolskiy et al. | |
| D740,848 S | 10/2015 | Bolts et al. | |
| D741,351 S | 10/2015 | Kito et al. | |
| D746,832 S | 1/2016 | Pearcy et al. | |
| 9,241,252 B2 | 1/2016 | Dua et al. | |
| 9,244,899 B1 | 1/2016 | Greenbaum | |
| 9,294,498 B1 | 3/2016 | Yampolskiy et al. | |
| D754,690 S | 4/2016 | Park et al. | |
| D754,696 S | 4/2016 | Follett et al. | |
| D756,371 S | 5/2016 | Bertnick et al. | |
| D756,372 S | 5/2016 | Bertnick et al. | |
| D756,392 S | 5/2016 | Yun et al. | |
| D759,084 S | 6/2016 | Yampolskiy et al. | |
| D759,689 S | 6/2016 | Olson et al. | |
| 9,372,994 B1 | 6/2016 | Yampolskiy et al. | |
| 9,373,144 B1 | 6/2016 | Ng et al. | |
| D760,782 S | 7/2016 | Kendler et al. | |
| 9,384,206 B1 | 7/2016 | Bono et al. | |
| 9,401,926 B1 | 7/2016 | Dubow et al. | |
| 9,407,658 B1 | 8/2016 | Kuskov et al. | |
| 9,424,333 B1 | 8/2016 | Bisignani et al. | |
| D771,695 S | 11/2016 | Yampolskiy et al. | |
| D772,276 S | 11/2016 | Yampolskiy et al. | |
| 9,501,647 B2 | 11/2016 | Yampolskiy et al. | |
| D773,507 S | 12/2016 | Sagrillo et al. | |
| D775,635 S | 1/2017 | Raji et al. | |
| D776,136 S | 1/2017 | Chen et al. | |
| D776,153 S | 1/2017 | Yampolskiy et al. | |
| D777,177 S | 1/2017 | Chen et al. | |
| 9,560,072 B1 | 1/2017 | Xu | |
| D778,927 S | 2/2017 | Bertnick et al. | |
| D778,928 S | 2/2017 | Bertnick et al. | |
| D779,512 S | 2/2017 | Kimura et al. | |
| D779,514 S | 2/2017 | Baris et al. | |
| D779,531 S | 2/2017 | List et al. | |
| D780,770 S | 3/2017 | Sum et al. | |
| D785,009 S | 4/2017 | Lim et al. | |
| D785,010 S | 4/2017 | Bachman et al. | |
| D785,016 S | 4/2017 | Berwick et al. | |
| 9,620,079 B2 | 4/2017 | Curtis | |
| D787,530 S | 5/2017 | Huang | |
| D788,128 S | 5/2017 | Wada | |
| 9,641,547 B2 | 5/2017 | Yampolskiy et al. | |
| 9,646,110 B2 | 5/2017 | Byrne et al. | |
| D789,947 S | 6/2017 | Sun | |
| D789,957 S | 6/2017 | Wu et al. | |
| D791,153 S | 7/2017 | Rice et al. | |
| D791,834 S | 7/2017 | Eze et al. | |
| D792,427 S | 7/2017 | Weaver et al. | |
| D795,891 S | 8/2017 | Kohan et al. | |
| D796,523 S | 9/2017 | Bhandari et al. | |
| D801,989 S | 11/2017 | Iketsuki et al. | |
| D803,237 S | 11/2017 | Wu et al. | |
| D804,528 S | 12/2017 | Martin et al. | |
| D806,735 S | 1/2018 | Olsen et al. | |
| D806,737 S | 1/2018 | Chung et al. | |
| D809,523 S | 2/2018 | Lipka et al. | |
| D812,633 S | 3/2018 | Saneii | |
| D814,483 S | 4/2018 | Gavaskar et al. | |
| D815,119 S | 4/2018 | Chalker et al. | |
| D815,148 S | 4/2018 | Martin et al. | |
| D816,105 S | 4/2018 | Rudick et al. | |
| D816,116 S | 4/2018 | Selassie | |
| 9,954,893 B1 | 4/2018 | Zhao et al. | |
| D817,970 S | 5/2018 | Chang et al. | |
| D817,977 S | 5/2018 | Kato et al. | |
| D819,687 S | 6/2018 | Yampolskiy et al. | |
| 10,044,750 B2 | 8/2018 | Livshits et al. | |
| 10,079,854 B1 | 9/2018 | Scott et al. | |
| 10,142,364 B2 | 11/2018 | Baukes et al. | |
| 10,180,966 B1 | 1/2019 | Lang et al. | |
| 10,185,924 B1 * | 1/2019 | McClintock | G06Q 10/0635 |
| 10,217,071 B2 | 2/2019 | Mo et al. | |
| 10,230,753 B2 | 3/2019 | Yampolskiy et al. | |
| 10,230,764 B2 | 3/2019 | Ng et al. | |
| 10,235,524 B2 | 3/2019 | Ford | |
| 10,257,219 B1 | 4/2019 | Geil et al. | |
| 10,305,854 B2 | 5/2019 | Alizadeh-Shabdiz et al. | |
| 10,331,502 B1 | 6/2019 | Hart | |
| 10,339,321 B2 * | 7/2019 | Tedeschi | G06F 21/577 |
| 10,339,484 B2 | 7/2019 | Pai et al. | |
| 10,348,755 B1 | 7/2019 | Shavell et al. | |
| 10,412,083 B2 | 9/2019 | Zou et al. | |
| 10,469,515 B2 | 11/2019 | Helmsen et al. | |
| 10,491,619 B2 | 11/2019 | Yampolskiy et al. | |
| 10,491,620 B2 | 11/2019 | Yampolskiy et al. | |
| 10,521,583 B1 | 12/2019 | Bagulho Monteiro Pereira | |
| 10,540,374 B2 | 1/2020 | Singh et al. | |
| D880,512 S | 4/2020 | Greenwald et al. | |
| 2001/0044798 A1 | 11/2001 | Nagral et al. | |
| 2002/0083077 A1 | 6/2002 | Vardi | |
| 2002/0133365 A1 | 9/2002 | Grey et al. | |
| 2002/0164983 A1 | 11/2002 | Raviv et al. | |
| 2003/0050862 A1 | 3/2003 | Bleicken et al. | |
| 2003/0123424 A1 | 7/2003 | Jung | |
| 2003/0187967 A1 | 10/2003 | Walsh et al. | |
| 2004/0003284 A1 | 1/2004 | Campbell et al. | |
| 2004/0010709 A1 | 1/2004 | Baudoin et al. | |
| 2004/0024859 A1 | 2/2004 | Bloch et al. | |
| 2004/0098375 A1 | 5/2004 | DeCarlo | |
| 2004/0133561 A1 | 7/2004 | Burke | |
| 2004/0133689 A1 | 7/2004 | Vasisht | |
| 2004/0193907 A1 | 9/2004 | Patanella | |
| 2004/0193918 A1 | 9/2004 | Green et al. | |
| 2004/0199791 A1 | 10/2004 | Poletto et al. | |
| 2004/0199792 A1 | 10/2004 | Tan et al. | |
| 2004/0221296 A1 | 11/2004 | Ogielski et al. | |
| 2004/0250122 A1 | 12/2004 | Newton | |
| 2004/0250134 A1 | 12/2004 | Kohler et al. | |
| 2005/0066195 A1 | 3/2005 | Jones | |
| 2005/0071450 A1 | 3/2005 | Allen et al. | |
| 2005/0076245 A1 | 4/2005 | Graham et al. | |
| 2005/0080720 A1 | 4/2005 | Betz et al. | |
| 2005/0108415 A1 | 5/2005 | Turk et al. | |
| 2005/0131830 A1 | 6/2005 | Juarez et al. | |
| 2005/0138413 A1 | 6/2005 | Lippmann et al. | |
| 2005/0160002 A1 | 7/2005 | Roetter et al. | |
| 2005/0234767 A1 | 10/2005 | Bolzman et al. | |
| 2005/0278726 A1 | 12/2005 | Cano et al. | |

(56) References Cited

U.S. PATENT DOCUMENTS

| | | |
|---|---|---|
| 2006/0036335 A1 | 2/2006 | Banter et al. |
| 2006/0107226 A1 | 5/2006 | Matthews et al. |
| 2006/0173992 A1 | 8/2006 | Weber et al. |
| 2006/0212925 A1 | 9/2006 | Shull et al. |
| 2006/0253581 A1 | 11/2006 | Dixon et al. |
| 2007/0016948 A1 | 1/2007 | Dubrovsky et al. |
| 2007/0067845 A1 | 3/2007 | Wiemer et al. |
| 2007/0143851 A1 | 6/2007 | Nicodemus et al. |
| 2007/0179955 A1 | 8/2007 | Croft et al. |
| 2007/0198275 A1 | 8/2007 | Malden et al. |
| 2007/0214151 A1 | 9/2007 | Thomas et al. |
| 2007/0282730 A1 | 12/2007 | Carpenter et al. |
| 2008/0017526 A1 | 1/2008 | Prescott et al. |
| 2008/0033775 A1 | 2/2008 | Dawson et al. |
| 2008/0047018 A1 | 2/2008 | Baudoin et al. |
| 2008/0091834 A1 | 4/2008 | Norton |
| 2008/0140495 A1 | 6/2008 | Bhamidipaty et al. |
| 2008/0140728 A1 | 6/2008 | Fraser et al. |
| 2008/0162931 A1 | 7/2008 | Lord et al. |
| 2008/0172382 A1 | 7/2008 | Prettejohn |
| 2008/0175266 A1 | 7/2008 | Alperovitch et al. |
| 2008/0208995 A1 | 8/2008 | Takahashi et al. |
| 2008/0209565 A2 | 8/2008 | Baudoin et al. |
| 2008/0222287 A1 | 9/2008 | Bahl et al. |
| 2008/0262895 A1 | 10/2008 | Hofmeister et al. |
| 2009/0044272 A1 | 2/2009 | Jarrett |
| 2009/0094265 A1 | 4/2009 | Vlachos et al. |
| 2009/0125427 A1 | 5/2009 | Atwood et al. |
| 2009/0132861 A1 | 5/2009 | Costa et al. |
| 2009/0161629 A1 | 6/2009 | Purkayastha et al. |
| 2009/0193054 A1 | 7/2009 | Karimisetty et al. |
| 2009/0216700 A1* | 8/2009 | Bouchard ............... G06N 20/00 706/46 |
| 2009/0265787 A9 | 10/2009 | Baudoin et al. |
| 2009/0293128 A1 | 11/2009 | Lippmann et al. |
| 2009/0299802 A1 | 12/2009 | Brennan |
| 2009/0300768 A1 | 12/2009 | Krishnamurthy et al. |
| 2009/0319420 A1 | 12/2009 | Sanchez et al. |
| 2009/0323632 A1 | 12/2009 | Nix |
| 2009/0328063 A1 | 12/2009 | Corvera et al. |
| 2010/0017880 A1 | 1/2010 | Masood |
| 2010/0042605 A1 | 2/2010 | Cheng et al. |
| 2010/0057582 A1 | 3/2010 | Arfin et al. |
| 2010/0186088 A1 | 7/2010 | Banerjee et al. |
| 2010/0205042 A1* | 8/2010 | Mun ...................... G06Q 10/06 705/59 |
| 2010/0218256 A1 | 8/2010 | Thomas et al. |
| 2010/0262444 A1 | 10/2010 | Atwal et al. |
| 2010/0275263 A1* | 10/2010 | Bennett ................. G06F 21/577 726/25 |
| 2010/0281124 A1 | 11/2010 | Westman et al. |
| 2010/0281151 A1 | 11/2010 | Ramankutty et al. |
| 2011/0137704 A1 | 6/2011 | Mitra et al. |
| 2011/0145576 A1 | 6/2011 | Bettan |
| 2011/0185403 A1 | 7/2011 | Dolan et al. |
| 2011/0213742 A1 | 9/2011 | Lemmond et al. |
| 2011/0219455 A1 | 9/2011 | Bhagwan et al. |
| 2011/0231395 A1 | 9/2011 | Vadlamani et al. |
| 2011/0239300 A1 | 9/2011 | Klein et al. |
| 2011/0296519 A1 | 12/2011 | Ide et al. |
| 2012/0036263 A1 | 2/2012 | Madden et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0198558 A1 | 8/2012 | Liu et al. |
| 2012/0215892 A1 | 8/2012 | Wanser et al. |
| 2012/0255027 A1 | 10/2012 | Kanakapura et al. |
| 2012/0291129 A1 | 11/2012 | Shulman et al. |
| 2013/0014253 A1 | 1/2013 | Neou et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0091574 A1 | 4/2013 | Howes et al. |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0227078 A1 | 8/2013 | Wei et al. |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1 | 12/2013 | Flores et al. |
| 2014/0006129 A1 | 1/2014 | Heath |
| 2014/0019196 A1 | 1/2014 | Wiggins et al. |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0146370 A1 | 5/2014 | Banner et al. |
| 2014/0189098 A1 | 7/2014 | MaGill et al. |
| 2014/0204803 A1 | 7/2014 | Nguyen et al. |
| 2014/0237545 A1* | 8/2014 | Mylavarapu ........ H04L 63/1433 726/3 |
| 2014/0244317 A1 | 8/2014 | Roberts et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0334336 A1 | 11/2014 | Chen et al. |
| 2014/0337633 A1 | 11/2014 | Yang et al. |
| 2015/0033331 A1 | 1/2015 | Stern et al. |
| 2015/0033341 A1 | 1/2015 | Schmidtler et al. |
| 2015/0074579 A1 | 3/2015 | Gladstone et al. |
| 2015/0081860 A1 | 3/2015 | Kuehnel et al. |
| 2015/0156084 A1 | 6/2015 | Kaminsky et al. |
| 2015/0180883 A1 | 6/2015 | Aktas et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0347756 A1 | 12/2015 | Hidayat et al. |
| 2015/0350229 A1 | 12/2015 | Mitchell |
| 2015/0381649 A1 | 12/2015 | Schultz et al. |
| 2016/0036849 A1 | 2/2016 | Zakian |
| 2016/0065613 A1 | 3/2016 | Cho et al. |
| 2016/0119373 A1 | 4/2016 | Fausto et al. |
| 2016/0140466 A1 | 5/2016 | Sidebottom et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0248797 A1 | 8/2016 | Yampolskiy et al. |
| 2016/0253500 A1 | 9/2016 | Alme et al. |
| 2016/0259945 A1 | 9/2016 | Yampolskiy et al. |
| 2016/0337387 A1 | 11/2016 | Hu et al. |
| 2016/0344801 A1 | 11/2016 | Akkarawittayapoom |
| 2016/0364496 A1 | 12/2016 | Li |
| 2016/0373485 A1 | 12/2016 | Kamble |
| 2017/0048267 A1 | 2/2017 | Yampolskiy et al. |
| 2017/0063901 A1 | 3/2017 | Muddu et al. |
| 2017/0142148 A1* | 5/2017 | Bu Er ................... G06F 21/552 |
| 2017/0161409 A1* | 6/2017 | Martin ................ G06F 17/5009 |
| 2017/0236078 A1 | 8/2017 | Rasumov |
| 2017/0237764 A1 | 8/2017 | Rasumov |
| 2017/0279843 A1* | 9/2017 | Schultz ................ H04L 63/1433 |
| 2017/0300911 A1 | 10/2017 | Alnajem |
| 2017/0316324 A1* | 11/2017 | Barrett .................... G06Q 10/04 |
| 2017/0318045 A1 | 11/2017 | Johns et al. |
| 2017/0324766 A1 | 11/2017 | Gonzalez Granadillo et al. |
| 2017/0337487 A1 | 11/2017 | Nock et al. |
| 2018/0013716 A1 | 1/2018 | Connell et al. |
| 2018/0103043 A1 | 4/2018 | Kupreev et al. |
| 2018/0123934 A1 | 5/2018 | Gissing et al. |
| 2018/0124110 A1 | 5/2018 | Hunt et al. |
| 2018/0139180 A1 | 5/2018 | Napchi et al. |
| 2018/0157468 A1 | 6/2018 | Stachura |

(56) References Cited

U.S. PATENT DOCUMENTS

| | | |
|---|---|---|
| 2018/0285414 A1 | 10/2018 | Kondiles et al. |
| 2018/0322584 A1 | 11/2018 | Crabtree et al. |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0065545 A1 | 2/2019 | Hazel et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0166152 A1* | 5/2019 | Steele ............ H04L 63/1441 |
| 2019/0215331 A1 | 7/2019 | Anakata et al. |
| 2019/0303574 A1 | 10/2019 | Lamay et al. |
| 2019/0379632 A1 | 12/2019 | Dahlberg et al. |
| 2019/0392252 A1* | 12/2019 | Fighel ............ G06K 9/6242 |
| 2020/0053127 A1 | 2/2020 | Brotherton et al. |
| 2020/0065213 A1* | 2/2020 | Poghosyan ...... G06F 11/3065 |
| 2020/0074084 A1 | 3/2020 | Dorrans et al. |

OTHER PUBLICATIONS

"About Neo4j," 1 page.
"Agreed Upon Procedures," Version 4.0, BITS, The Financial Institution Shared Assessments Program, Assessment Guide, Sep. 2008, 56 pages.
"Amazon Mechanical Turk," accessed on the internet at https://www.mturk.com/; 7 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Computer Network Graph," http://www.opte.org; 1 page.
"Creating Transparency with Palantir," accessed on the internet at https://www.youtube.com/watch?v=8cbGChfagUA; Jul. 5, 2012; 1 page.
"Gephi (gephi.org)," accessed on the internet at https://web.archive.org/web/20151216223216/https://gephi.org/; Dec. 16, 2015; 1 page.
"Master Security Criteria," Version 3.0, BITS Financial Services Security Laboratory, Oct. 2001, 47 pages.
"Mile 2 CPTE Maltego Demo," accessed on the internet at https://www.youtube.com/watch?v=o2oNKOUzP0U; Jul. 12, 2012; 1 page.
"Neo4j (neo4j.com)," accessed on the internet at https://web.archive.org/web/20151220150341/http://neo4j.com:80/developer/ guide-data-visualization/; Dec. 20, 2015; 1 page.
"Palantir Cyber: Uncovering malicious behavior at petabyte scale," accessed on the internet at https://www.youtube.com/watch?v=_EhYezVO6EE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.11.miLedufpublicationsflabnotesfpluggingtherightho! . . . , 2 pages.
"Rapid7 Nexpose Vulnerability Scanner," accessed on the internet at https://www.rapid7.com/products/nexpose/download/, 5 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Tenable Nessus Network Vulnerability Scanner," accessed on the internet at https://www.tenable.com/products/nessus/nessus-professional; 13 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
2009 Data Breach Investigations Report, study conducted by Verizon Business RISK Team, 52 pages.
Application as filed, and pending claims of U.S. Appl. No. 13/240,572 as of Nov. 18, 2015, 45 pages.
Artz, Michael Lyle, "NetSPA: A Network Security Planning Architecture," Massachusetts Institute of Technology, May 24, 2002, 97 pages.
Bhilare et al., "Protecting Intellectual Property and Sensitive Information in Academic Campuses from Trusted Insiders: Leveraging Active Directory", SIGUCC, Oct. 2009, 5 pages.
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Browne, Niall, et al., "Shared Assessments Program AUP and SAS70 Frequently Asked Questions," BITS, 4 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Carstens, et al., "Modeling Company Risk and Importance in Supply Graphs," European Semantic Web Conference 2017: The Semantic Web pp. 18-31.
Chu, Matthew, et al., "Visualizing Attack Graphs, Reachability, and Trust Relationships with NAVIGATOR," MIT Lincoln Library, VizSEC '10, Ontario, Canada, Sep. 14, 2010, 12 pages.
Chuvakin, "SIEM: Moving beyond compliance", RSA White Paper, 2010, 16 pages.
Computer Network Graph—Bees, http://bioteams.com/2007/04/30/visualizing_complex_networks.html, date accessed Sep. 28, 2016, 2 pages.
Computer Network Graph—Univ. of Michigan, http://people.cst.cmich.edu/liao1q/research.shtml, date accessed Sep. 28, 2016, 5 pages.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dillon-Merrill, PhD., Robin L, et al., "Logic Trees: Fault, Success, Attack, Event, Probability, and Decision Trees," Wiley Handbook of Science and Technology for Homeland Security, 13 pages.
Dun & Bradstreet Corp. Stock Report, Standard & Poor's, Jun. 6, 2009, 8 pages.
Dun & Bradstreet, The DUNSRight Quality Process: Power Behind Quality Information, 24 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber=5976796, 8 pages.
Hacking Exposed 6, S. McClure et al., copyright 2009, 37 pages.

(56) References Cited

OTHER PUBLICATIONS

Ingols, Kyle, et al., "Modeling Modern Network Attacks and Countermeasures Using Attack Graphs," MIT Lincoln Laboratory, 16 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.
Jin et al, "Identifying and tracking suspicious activities through IP gray space analysis", MineNet, Jun. 12, 2007, 6 pages.
U.S. Appl. No. 16/405,121, Methods for Using Organizational Behavior for Risk Ratings, filed May 7, 2019.
U.S. Appl. No. 13/240,572 Published as: US2016/0205126, Information Technology Security Assessment System, filed Sep. 22, 2011.
U.S. Appl. No. 16/015,686, Methods for Mapping IP Addresses and Domains to Organizations Using User Activity Data, filed Jun. 22, 2018.
U.S. Appl. No. 16/543,075, Methods for Mapping IP Addresses and Domains to Organizations Using User Activity Data, filed Aug. 16, 2019.
U.S. Appl. No. 16/292,956, Correlated Risk in Cybersecurity, filed Mar. 5, 2019.
U.S. Appl. No. 16/170,680, Systems and Methods for Remote Detection of Software Through Browser Webinjects, filed Oct. 25, 2018.
U.S. Appl. No. 15/954,921, Systems and Methods for External Detection of Misconfigured Systems, filed Apr. 17, 2018.
U.S. Appl. No. 29/666,942, Computer Display With Forecast Graphical User Interface, filed Oct. 17, 2018.
U.S. Appl. No. 16/514,771, Systems and Methods for Generating Security Improvement Plans for Entities, filed Jul. 17, 2019.
U.S. Appl. No. 29/677,306, Computer Display With Corporate Hierarchy Graphical User Interface, filed Jan. 18, 2019.
U.S. Appl. No. 15/216,955, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, the Office Action dated Mar. 21, 2018 and the Notice of Allowance dated Jan. 14, 2019.
U.S. Appl. No. 16/405,121, the Office Action dated Aug. 1, 2019.
U.S. Appl. No. 13/240,572, the Office Actions dated May 7, 2013, Nov. 21, 2013, Jun. 16, 2014, Feb. 27, 2015, Jun. 3, 2015, Oct. 26, 2015, Mar. 10, 2016, Feb. 13, 2017, and Examiner's Answer to Appeal Brief dated May 16, 2018.
U.S. Appl. No. 15/044,952, the Office Action dated Jul. 8, 2019.
U.S. Appl. No. 29/599,620, now U.S. Pat. No. D. 846,562, the Notice of Allowance dated Nov. 27, 2018.
U.S. Appl. No. 16/015,686, the Office Action dated Nov. 16, 2018 and the Notice of Allowance dated May 10, 2019.
U.S. Appl. No. 15/918,286, the Office Action dated Aug. 7, 2018 and the Notice of Allowance dated Nov. 29, 2018.
U.S. Appl. No. 16/292,956, the Office Action dated Jul. 10, 2019.
U.S. Appl. No. 16/170,680, the Office Action dated Mar. 26, 2019.
U.S. Appl. No. 15/954,921, the Office Actions dated Sep. 4, 2018, Jan. 3, 2019, and Aug. 19, 2019.
Johnson, Eric, et al., "Information Risk and the Evolution of the Security Rating Industry," Mar. 24, 2009, 27 pages.
Joslyn, et al., "Massive Scale Cyber Traffic Analysis: A Driver for Graph Database Research," Proceedings of the First International Workshop on Graph Data Management Experience and Systems (GRADES 2013), 6 pages.
KC Claffy, "Internet measurement and data analysis: topology, workload, performance and routing statistics," accessed on the Internet at http://www.caida.org/publications/papers/1999/Nae/Nae.html., NAE '99 workshop, 1999, 22 pages.
Li et al., "Finding the Linchpins of the Dark Web: a Study on Topologically Dedicated Hosts on Malicious Web Infrastructures", IEEE, 2013, 15 pages.
Lippmann, Rich, et al., NetSPA: a Network Security Planning Architecture, MIT Lincoln Laboratory, 11 pages.
Lippmann, Richard, et al., "Validating and Restoring Defense in Depth Using Attack Graphs," MIT Lincoln Laboratory, 10 pages.
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Maltego XL, accessed on the Internet at https://www.paterva.com/web7/buy/maltego-clients/maltego-xl.php, 5 pages.
Massimo Candela, "Real-time BGP Visualisation with BGPlay," accessed on the Internet at https://labs.ripe.net/Members/massimo_candela/real-time-bgp-visualisation- with-bgplay), Sep. 30, 2015, 8 pages.
MaxMind, https://www.maxmind.com/en/about-maxmind, https://www.maxmind.com/en/geoip2-isp-database, date accessed Sep. 28, 20116, 3 pages.
McNab, "Network Security Assessment," copyright 2004, 55 pages.
Method Documentation, CNSS Risk Assessment Tool Version 1.1, Mar. 31, 2009, 24 pages.
Moradi, et al., "Quantitative Models for Supply Chain Management," IGI Global, 2012, 29 pages.
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
Pending claims for U.S. Appl. No. 14/021,585, as of Apr. 29, 2016, 2 pages.
Pending claims for U.S. Appl. No. 14/021,585, as of Nov. 18, 2015, 6 pages.
U.S. Appl. No. 13/240,572 and pending claims as of Mar. 22, 2016, 10 pages.
U.S. Appl. No. 13/240,572 as of Oct. 7, 2015, application as filed and pending claims, 45 pages.
U.S. Appl. No. 14/021,585 and pending claims as of Mar. 22, 2016, 2 pages.
U.S. Appl. No. 14/021,585 as of Oct. 7, 2015 and application as filed, 70 pages.
U.S. Appl. No. 14/944,484 and pending claims as of Mar. 22, 2016, 4 pages.
U.S. Appl. No. 61/386,156.
Application as filed and pending claims for U.S. Appl. No. 13/240,572 as of Apr. 29, 2016, 46 pages.
Application as filed and pending claims for U.S. Appl. No. 14/944,484 as of Apr. 29, 2016, 4 pages.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part I—Proposal Preparation & Submission Guidelines GPG, The National Science Foundation, Feb. 2009, 68 pages.
Provos et al., "The Ghost in the Browser Analysis of Web-based Malware", 2007, 9 pages.
Rare Events, Oct. 2009, JASON, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.

(56) References Cited

OTHER PUBLICATIONS

RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Security Warrior, Cyrus Peikari, Anton, Chapter 8: Reconnaissance, 6 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Stone-Gross, Brett, et al., "FIRE: Finding Rogue Networks," 10 pages.
Taleb, Nassim N., et al., "The Six Mistakes Executives Make in Risk Management," Harvard Business Review, Oct. 2009, 5 pages.
The CIS Security Metrics vI.0.0, The Center for Internet Security, May 11, 2009, 90 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory" Int. J. Production Economics 126 (2010) 121-129.
Wikipedia, https://en.wikipedia.org/wiki/Crowdsourcing, date accessed Sep. 28, 2016, 25 pages.
U.S. Appl. No. 15/216,955 U.S. Pat. No. 10,326,786 Published as: US2016/0330231, Methods for Using Organizational Behavior for Risk Ratings, filed Jul. 22, 2016.
U.S. Appl. No. 15/239,063 U.S. Pat. No. 10,341,370 Published as: US2017/0093901, Security Risk Management, filed Aug. 17, 2016.
U.S. Appl. No. 16/015,686 U.S. Pat. No. 10,425,380 Published as: US2018/0375822, Methods for Mapping IP Addresses and Domains to Organizations Using User Activity Data, filed Jun. 22, 2018.
U.S. Appl. No. 16/292,956 Patented as: US2019/0297106, Correlated Risk in Cybersecurity, filed Mar. 5, 2019.
U.S. Appl. No. 15/954,921 Published as: US2019/0319979, Systems and Methods for External Detection of Misconfigured Systems, filed Apr. 17, 2018.
U.S. Appl. No. 16/583,991, Systems and Methods for Network Asset Discovery and Association Thereof With Entities, filed Sep. 26, 2019.
U.S. Appl. No. 16/543,075, the Notice ot Allowance dated Sep. 25, 2019.
U.S. Appl. No. 16/292,956, the Office Action dated Jul. 10, 2019 and the Notice of Allowance dated Oct. 31, 2019.
U.S. Appl. No. 16/170,680, the Office Action dated Mar. 26, 2019 and the Notice of Allowance dated Aug. 27, 2019.
Williams, Leevar, et al., "An Interactive Attack Graph Cascade and Reachability Display," MIT Lincoln Laboratory, 17 pages.
Williams, Leevar, et al., "GARNET: A Graphical Attack Graph and Reachability Network Evaluation Tool," MIT Lincoln Library, VizSEC 2009, pp. 44-59.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Search Query Report form IP.com (performed Apr. 27, 2020).
Camelo et al., "CONDENSER: A Graph-Based Approach for Detecting Botnets," AnubisNetworks R&D, Amadora, Portugal, 8 pages.
Camelo, "Botnet Cluster Identification," Sep. 2014, 2 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Luo, Hui; Henry, Paul. A Secure Public Wireless LAN Access Technique That Supports Walk-Up Users. GLOBECOM '03. IEEE Global Telecommunications Conference. https://ieeexplore.ieee.org/stamp/stamp.jsp?tp=&arnumber= 1258471 (Year: 2003).
Seigneur et al., A Survey of Trust and Risk Metrics for a BYOD Mobile Worker World: Third International Conference on Social Eco-Informatics, 2013, 11 pages.
U.S. Appl. No. 15/271,655 Published as: US2018/0083999, Self-Published Security Risk Management, filed Sep. 21, 2016.
U.S. Appl. No. 15/377,574 U.S. Pat. No. 9,705,932, Methods and Systems for Creating, De-duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 Published as: US2016/0330231, Methods for Using Organizational Behavior for Risk Ratings, filed Jul. 22, 2016.
U.S. Appl. No. 15/239,063 Published as: US2017/0093901, Security Risk Management, filed Aug. 17, 2016.
U.S. Appl. No. 16/405,121 Published as: US2019/0260791, Methods for Using Organizational Behavior for Risk Ratings, filed May 7, 2019.
U.S. Appl. No. 17/025,930 Published as: US 2021-0006581 A1, Methods for Using Organizational Behavior for Risk Ratings, filed Sep. 18, 2020.
U.S. Appl. No. 13/240,572 U.S. Pat. No. 10,805,331 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 15/142,677 U.S. Pat. No. 9,830,569 Published as: US/2016/0239772, Security Assessment Using Service Provider Digital Asset Information, filed Apr. 29, 2016.
U.S. Appl. No. 15/134,845 U.S. Pat. No. 9,680,858, Annotation Platform for a Security Risk System, filed Apr. 21, 2016.
U.S. Appl. No. 15/044,952 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 U.S. Pat. No. D. 835,631, Computer Display Screen With Graphical User Interface, filed Mar. 24, 2017.
U.S. Appl. No. 29/598,299 U.S. Pat. No. D. 818,475, Computer Display With Security Ratings Graphical User Interface, filed Mar. 24, 2017.
U.S. Appl. No. 29/599,622 U.S. Pat. No. D. 847,169, Computer Display With Security Ratings Graphical User Interface, filed Apr. 5, 2017.
U.S. Appl. No. 29/599,620 U.S. Pat. No. D. 846,562, Computer Display With Security Ratings Graphical User Interface, filed Apr. 5, 2017.
U.S. Appl. No. 16/015,686 U.S. Pat. No. 10,425,380, Methods for Mapping IP Addresses and Domains to Organizations Using User Activity Data, filed Jun. 22, 2018.
U.S. Appl. No. 16/543,075 U.S. Pat. No. 10,554,619, Methods for Mapping IP Addresses and Domains to Organizations Using User Activity Data, filed Aug. 16, 2019.
U.S. Appl. No. 16/738,825 U.S. Pat. No. 10,893,021, Methods for Mapping IP Addresses and Domains to Organizations Using User Activity Data, filed Jan. 9, 2020.

(56) References Cited

OTHER PUBLICATIONS

U.S. Appl. No. 17/146,064, Methods for Mapping IP Addresses and Domains to Organizations Using User Activity Data, filed Jan. 11, 2021.
U.S. Appl. No. 15/918,286 U.S. Pat. No. 10,257,219, Correlated Risk in Cybersecurity, filed Mar. 12, 2018.
U.S. Appl. No. 16/292,956 U.S. Pat. No. 10,594,723, Correlated Risk in Cybersecurity, filed May 5, 2019.
U.S. Appl. No. 16/795,056 U.S. Pat. No. 10,931,705 Published as: 2020-0195681 A1, Correlated Risk in Cybersecurity, filed Feb. 19, 2020.
U.S. Appl. No. 16/170,680 U.S. Pat. No. 10,521,583, Systems and Methods for Remote Detection of Software Through Browser Webinjects, filed Oct. 25, 2018.
U.S. Appl. No. 16/688,647 U.S. Pat. No. 10,776,483 Published as: US 2020-0134174 A1, Systems and Methods for Remote Detection of Software Through Browser Webinjects, filed Nov. 19, 2019.
U.S. Appl. No. 15/954,921 U.S. Pat. No. 10,812,520 Published as: US 2019-0319979 A1, Systems and Methods for External Detection of Misconfigured Systems, filed Apr. 17, 2018.
U.S. Appl. No. 17/014,495 Published as: US 2020-0404017 A1, Systems and Methods for External Detection of Misconfigured Systems, filed Sep. 8, 2020.
U.S. Appl. No. 16/549,764, Systems and Methods for Inferring Entity Relationships via Network Communications of Users or User Devices, filed Aug. 23, 2019.
U.S. Appl. No. 16/787,650 U.S. Pat. No. 10,749,893, Systems and Methods for Inferring Entity Relationships via Network Communications of Users or User Devices, filed Feb. 11, 2020.
U.S. Appl. No. 16/583,991 U.S. Pat. No. 10,848,382, Systems and Methods for Network Asset Discovery and Association Thereof With Entities, filed Sep. 26, 2019.
U.S. Appl. No. 29/666,942 U.S. Pat. No. D. 892,135, Computer Display With Graphical User Interface, filed Oct. 17, 2018.
U.S. Appl. No. 16/514,771 U.S. Pat. No. 10,726,136, Systems and Methods for Generating Security Improvement Plans for Entities, filed Jul. 17, 2019.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840 U.S. Pat. No. 10,791,140, Systems and Methods for Assessing Cybersecurity State of Entities Based on Computer Network Characterization, filed Jan. 29, 2020.
U.S. Appl. No. 16/779,437 U.S. Pat. No. 10,791,140, Systems and Methods for Rapidly Producing Security Ratings, filed Jan. 31, 2020.
U.S. Appl. No. 17/039,675 U.S. Pat. No. 10,893,067, Systems and Methods for Rapidly Generating Security Ratings, filed Jan. 31, 2020.
U.S. Appl. No. 17/119,822, Systems and Methods for Cybersecurity Risk Mitigation and Management, filed Dec. 11, 2020.
U.S. Appl. No. 16/802,232 U.S. Pat. No. 10,764,298, Systems and Methods for Improving a Security Profile of an Entity Based on Peer Security Profiles, filed Feb. 26, 2020.
U.S. Appl. No. 16/942,452, Systems and Methods for Improving a Security Profile of an Entity Based on Peer Security Profiles, filed Jul. 29, 2020.
U.S. Appl. No. 29/725,724, Computer Display With Risk Vectors Graphical User Interface, filed Feb. 26, 2020.
U.S. Appl. No. 29/736,641, Computer Display With Peer Analytics Graphical User Interface, filed Jun. 2, 2020.
U.S. Appl. No. 17/039,675, Systems and Methods for Determining Asset Importance in Security Risk Management, filed Sep. 30, 2020.
U.S. Appl. No. 15/271,655, the Office Actions dated Feb. 21, 2017 and Aug. 18, 2017.
U.S. Appl. No. 15/377,574, now U.S. Pat. No. 9,705,932, the Office Action dated Mar. 2, 2017 and the Notice of Allowance dated Jun. 1, 2017.
U.S. Appl. No. 14/021,585, now U.S. Pat. No. 9,438,615, the Office Action dated Mar. 11, 2016 and the Notice of Allowance dated Aug. 9, 2016.
U.S. Appl. No. 15/216,955, now U.S. Pat. No. 10,326,786, the Office Actions dated Nov. 4, 2016, Mar. 9, 2017, Jun. 6, 2017, Dec. 5, 2017, and Aug. 29, 2018, and the Notice of Allowance dated Feb. 6, 2019.
U.S. Appl. No. 15/239,063, now U.S. Pat. No. 10,341,370, the Office Action dated Mar. 21, 2018 and the Notice of Allowance dated Jan. 14, 2019.
U.S. Appl. No. 16/405,121, the Office Action dated Aug. 1, 2019 and Nov. 21, 2019.
U.S. Appl. No. 13/240,572, the Office Actions dated Nov. 21, 2013, Jun. 16, 2014, Feb. 27, 2015, Jun. 3, 2015, Oct. 26, 2015, Mar. 10, 2016 Feb. 13, 2017 and the Notice of Allowance dated Jun. 1, 2020.
U.S. Appl. No. 14/944,484, now U.S. Pat. No. 9,973,524, the Office Actions dated Mar. 11, 2016, Jul. 5, 2016, and Jan. 17, 2017 and the Notice of Allowance dated Oct. 20, 2017.
U.S. Appl. No. 15/142,677, now U.S. Pat. No. 9,830,569, the Office Actions dated Jul. 26, 2016, and Apr. 24, 2017 and the Notice of Allowance dated Oct. 11, 2017.
U.S. Appl. No. 15/134,845, now U.S. Pat. No. 9,680,858, the Office Actions dated Jul. 19, 2016 and Jan. 26, 2017, and the Notices of Allowance dated Apr. 27, 2017 and May 9, 2017.
U.S. Appl. No. 15/044,952, the Office Action dated Jul. 8, 2019, Feb. 21, 2020, and Sep. 30, 2020.
U.S. Appl. No. 15/089,375, now U.S. Pat. No. 10,176,445, the Office Actions dated Sep. 9, 2016, May 17, 2017, and Nov. 17, 2017 and the Notice of Allowance dated Aug. 9, 2018.
U.S. Appl. No. 29/598,298, now U.S. Pat. No. D. 835,631, the Notice of Allowance dated Aug. 15, 2018.
U.S. Appl. No. 29/598,299, now U.S. Pat. No. D. 818,475, the Notice of Allowance dated Jan. 2, 2018.
U.S. Appl. No. 29/599,622, now U.S. Pat. No. D. 847,169, the Notice of Allowance dated Dec. 11, 2018.
U.S. Appl. No. 29/599,620, now U.S. Pat. No. D. 846,562, the Office Action dated May 3, 2018, the Notice of Allowance dated Nov. 27, 2018.
U.S. Appl. No. 16/015,686, now U.S. Pat. No. 10,425,380, the Office Action dated Nov. 16, 2018 and the Notice of Allowance dated May 10, 2019.
U.S. Appl. No. 16/543,075, the Notice of Allowance dated Sep. 25, 2019.
U.S. Appl. No. 16/738,825, the Office Actions dated Jul. 8, 2019 and Feb. 21, 2020.
U.S. Appl. No. 15/918,286, now U.S. Pat. No. 10,257,219, the Office Action dated Aug. 7, 2018 and the Notice of Allowance dated Nov. 29, 2018.
U.S. Appl. No. 16/292,956, the Office Action dated Jul. 10, 2019 and the Notices of Allowance dated Jan. 8, 2020 and Jan. 27, 2020.
U.S. Appl. No. 16/795,056, the Office Action dated May 1, 2020.
U.S. Appl. No. 16/170,680, the Office Action dated Mar. 26, 2019; the Notices of Allowance dated Oct. 29, 2019 and Aug. 27, 2019.
U.S. Appl. No. 16/688,647, the Office Action dated Jan. 29, 2020; the Notice of Allowance dated May 12, 2020.
U.S. Appl. No. 17/000,135, the Office Action dated Feb. 2, 2021.
U.S. Appl. No. 15/954,921, the Office Actions dated Sep. 4, 2018, Jan. 3, 2019, Aug. 19, 2019, and Dec. 5, 2019; Advisory Action dated Mar. 3, 2020.
U.S. Appl. No. 16/787,650, the Notice of Allowance dated Apr. 7, 2020.
U.S. Appl. No. 16/583,991, the Office Action dated Jan. 13, 2020.
U.S. Appl. No. 29/666,942, the Notice of Allowance dated Apr. 30, 2020.
U.S. Appl. No. 16/360,641, the Office Action dated Aug. 7, 2019, Feb. 20, 2020 and Sep. 4, 2020.
U.S. Appl. No. 16/514,771, the Office Action dated Dec. 4, 2019; the Notice of Allowance dated Mar. 18, 2020.
U.S. Appl. No. 16/922,673, the Office Action dated Jan. 22, 2021.
U.S. Appl. No. 16/775,840, the Notice of Allowance dated May 19, 2020.
U.S. Appl. No. 16/779,437, the Notices of Allowance dated Aug. 12, 2020, Oct. 26, 2020 and Nov. 9, 2020.

(56) References Cited

OTHER PUBLICATIONS

U.S. Appl. No. 16/802,232, the Notice of Allowance dated Apr. 24, 2020.
U.S. Appl. No. 16/942,452, the Office Action dated Oct. 23, 2020.
U.S. Appl. No. 29/736,641, the Office Action dated Mar. 3, 2021.
U.S. Appl. No. 17/039,675, the Notice of Allowance dated Feb. 3, 2021.
U.S. Appl. No. 16/884,607, the Office Action dated Jan. 25, 2021.

* cited by examiner

SYSTEMS AND METHODS FOR FORECASTING CYBERSECURITY RATINGS BASED ON EVENT-RATE SCENARIOS

CROSS-REFERENCE TO RELATED APPLICATION

This application is a continuation-in-part of and claims priority under 35 U.S.C. § 120 to U.S. Patent Design Application No. 29/666,942, titled "Computer Display with Forecast Graphical User Interface" on Oct. 17, 2018, the entire contents of which are hereby incorporated by reference herein.

TECHNICAL FIELD

The following disclosure is directed to methods and systems for forecasting security ratings for an entity and, more specifically, methods and systems for generating a forecast cone of security ratings for instantiations of security scenarios for an entity.

BACKGROUND

Many organizations attempt to manage their cybersecurity risks by evaluating present exposure to cyber threats based on past security events and the present configuration of their information technology systems. Security events can include botnet infections, spam propagation, vulnerable open ports, etc. These attempts assume that the organization will eliminate any vulnerabilities in its systems and have no security events going forward. However, this assumption is unrealistic as many types of the security events are difficult to completely prevent or eliminate.

SUMMARY

Forecasting security ratings for entities by taking into account future security events can aid entities in realistically managing their cybersecurity vulnerabilities. Additionally, forecasts of security ratings can help third parties, such as insurance providers or business partners, in evaluating an organization's exposure to and ability to address cyber threats into the future. Therefore, the systems and methods described herein for forecasting security ratings can aid in the management and prevention of cybersecurity threats to entities.

In one aspect, the disclosure features a computer-implemented method for forecasting security ratings for an entity. The method can include generating a plurality of simulated instantiations of a security scenario for the entity, in which the security scenario characterized by a plurality of security events associated with at least one event type. The method can further include determining a security rating for each instantiation of the plurality of instantiations; and generating a forecast cone based on the determined security ratings for the plurality of instantiations.

Various embodiments of the method can include one or more of following features.

Generating the plurality of simulated instantiations of the security scenario for the entity can include, for each event type of the at least one event type: (i) determining a rate of the security events associated with the event type over a forecasting period; (ii) determining a duration of the security events associated with the event type in the forecasting period; and/or (iii) determining a temporal placement of the security events associated with the event type in the forecasting period. Determining the rate of the security events associated with the event type over the forecasting period can include sampling from a distribution to determine the rate of the security events associated with the event type. The distribution of the rate can be: a normal distribution, a log-normal distribution, a geometric distribution, a Poisson distribution, or a uniform distribution. Determining the duration of the security events associated with the event type in the forecasting period can include sampling from a distribution to determine the duration of the security events associated with the event type. The distribution of the duration can be: a normal distribution, a log-normal distribution, a geometric distribution, a Poisson distribution, or a uniform distribution. Determining the temporal placement of the security events associated with the event type in the forecasting period can include sampling from a distribution to determine the temporal placement of the security events associated with the event type. The distribution of the temporal placement can be: a normal distribution, a log-normal distribution, a geometric distribution, a Poisson distribution, or a uniform distribution.

Determining the security rating for each instantiation of the plurality of instantiations can include assigning a weight to security events of each event type. Determining the security rating for each instantiation of the plurality of instantiations can include generating a ratings time series for the instantiation, the ratings time series forming a security forecast for the instantiation. Generating a forecast cone based on the determined security ratings for the plurality of instantiations can include determining a subset of the security forecasts to generate the forecast cone. An inner band of the forecast cone can be based on a $25^{th}$ percentile and a $75^{th}$ percentile of the subset of the security forecasts and an outer band of the forecast cone can be based on a $5^{th}$ percentile and $95^{th}$ percentile of the subset of security forecasts.

In another aspect, the disclosure features a system for forecasting security ratings for an entity. The system can include at least one memory storing computer-executable instructions; and at least one processor for executing the instructions storing on the memory. The execution of the instructions can program the at least one processor to perform operations including generating a plurality of simulated instantiations of a security scenario for the entity, the security scenario characterized by a plurality of security events associated with at least one event type; determining a security rating for each instantiation of the plurality of instantiations; and generating a forecast cone based on the determined security ratings for the plurality of instantiations.

Various embodiments of the system can include one or more of the following features.

Generating the plurality of simulated instantiations of the security scenario for the entity can include, for each event type of the at least one event type, (i) determining a rate of the security events associated with the event type over a forecasting period; (ii) determining a duration of the security events associated with the event type in the forecasting period; and/or (iii) determining a temporal placement of the security events associated with the event type in the forecasting period. Determining the rate of the security events associated with the event type over the forecasting period can include sampling from a distribution to determine the rate of the security events associated with the event type. The distribution of the rate can be: a normal distribution, a log-normal distribution, a geometric distribution, a Poisson distribution, or a uniform distribution. Determining the duration of the security events associated with the event type in the forecasting period can include sampling from a distribution to determine the duration of the security events associated with the event type. The distribution of the duration can be: a normal distribution, a log-normal distribution, a geometric distribution, a Poisson distribution, or a uniform distribution. Determining the temporal placement of the security events associated with the event type in the forecasting period can include sampling from a distribution to determine the temporal placement of the security events associated with the event type. The distribution of the temporal placement can be: a normal distribution, a log-normal distribution, a geometric distribution, a Poisson distribution, or a uniform distribution.

Determining the security rating for each instantiation of the plurality of instantiations can include assigning a weight to security events of each event type. Determining the security rating for each instantiation of the plurality of instantiations can include generating a ratings time series for the instantiation, in which the ratings time series forming a security forecast for the instantiation. Generating a forecast cone based on the determined security ratings for the plurality of instantiations can include determining a subset of the security forecasts to generate the forecast cone. The inner band of the forecast cone can be based on a $25^{th}$ percentile and a $75^{th}$ percentile of the subset of the security forecasts and an outer band of the forecast cone can be based on a $5^{th}$ percentile and a $95^{th}$ percentile of the subset of security forecasts.

DETAILED DESCRIPTION

Figure 1:
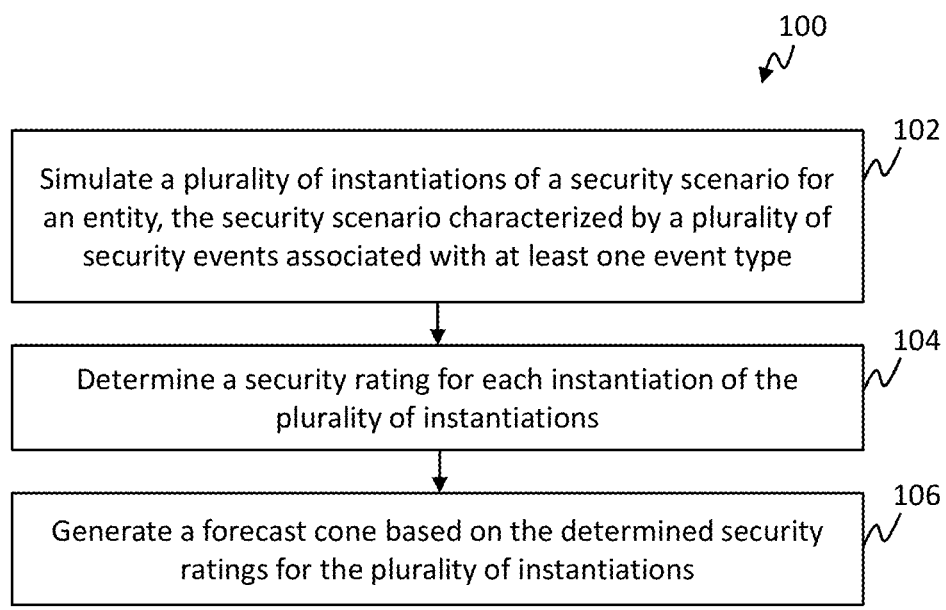
FIG. 1 is a flowchart of an exemplary method for forecasting security ratings for an entity.

FIG. 1 is a flowchart of an exemplary method 100 for forecasting security ratings for an entity. An entity can be an organization, a company, a nonprofit, a school, a governmental entity, a group of people, etc. In step 102, the system is configured to simulate instantiations of a security scenario attributed to the entity. The security scenario is characterized by the projected occurrence of multiple security events of at least one security event type. Event types can include, for example, botnet infections, peer-to-peer file sharing, spam propagation, a structured query language (SQL) injection, malware, phishing, man-in-the-middle attack, denial-of-service attack, exploit of unpatched software, ransomware, spyware, social engineered trojans, network traveling worms, advanced persistent threats, wiper attacks, data manipulation or destruction, malvertising, rogue software, vulnerable open ports, insecure Internet of Things (IoT) devices, incorrect secure sockets layer (SSL) configurations, etc. It is understood that other event types may be used in simulating the security scenario. The exemplary system may simulate dozens, hundreds, or thousands of instantiations of a security scenario for the entity.

In some embodiments, the system can simulate instantiations of a security scenario for a forecasting period. For example, the forecasting period may be one or more months or one or more years from a present date (or another date). For each type of event in a particular instantiation of a security scenario, the exemplary system can be configured to (i) determine the rate or frequency of the security events of a particular event type over the forecasting period, (ii) determine the duration of the security events of a particular event type in the forecasting period, and/or (iii) determine the temporal placement of the security events of a particular event type during the forecasting period. In determining the rate, the duration, and/or the temporal placement of the security events of a particular event type, the exemplary system can use a probability distribution.

Any probability distribution can be used to determine each of the rate, duration, and/or temporal placement and can include (but is not limited to): a normal distribution, a log-normal distribution, a geometric distribution, a hyper-geometric distribution, a Poisson distribution, a uniform distribution, a Bernoulli distribution, a binomial distribution, a negative binomial distribution, an exponential distribution, a gamma distribution, a beta distribution, a Student's t distribution, a Weibull distribution, a chi-squared distribution, etc. For instance, for a particular event type, the system can sample from (i) a normal distribution to determine the rate of the security events, (ii) a geometric distribution to determine the duration of each security event of a particular type, and (iii) a uniform distribution to determine the temporal placement of the security events in the forecasting period. In some embodiments, a joint distribution or a multivariate distribution can be used in simulating instantiations of a security scenario. For example, the rate and duration of a particular type of event may be determined based on a bivariate distribution (e.g., bivariate normal distribution).

In step 104, the system determines a security rating for each instantiation of the security scenario. Examples of determining security ratings for security scenarios can be found in commonly owned U.S. Pat. No. 9,973,524 issued May 15, 2018 and titled "Information Technology Security Assessment System," the entirety of which is incorporated by reference herein. For example, a security rating can be generated by collecting information about an entity's computer system, e.g., information technology assets that the entity controls, uses, or is affiliated with. Examples of asset ownership include control and operation of an Internet Protocol (IP) network address range or computer services such as web servers residing within that address block. Information about entities also includes relationships such as subsidiaries, affiliates, etc., that describe entity association. External data can be collected and include multiple data types, such as breach disclosures, block lists, configuration parameters, malware servers, reputation metrics, suspicious activity, spyware, white lists, compromised hosts, malicious activity, spam activity, vulnerable hosts, phishing, user behavior, or email viruses. To determine the security rating for an entity, the system aggregates some or all of the collected data. For example, IP addresses are mapped to an entity. IP addresses controlled by the entity can be processed with the following steps:

1. For each IP address, determine a security quality metric called "badness."
2. Badness is represented as a number between 0 and 1 corresponding to the extent and duration of malicious activity that was reported.
3. For each data source in which the IP address is reported, determine a data source-specific badness score for that IP address.
4. Consolidate the badness score for a given IP address across all data sources by cross-validating data to determine the aggregate badness for that IP address.
5. Aggregate the badness scores of IP addresses from an entity to determine the entity's IP address asset based security quality metric.

In another example, the system may aggregate "badness" across a set of IP addresses for a particular security risk or event type (see above). The security rating can then be determined for the aggregated set. It is understood that other methods of determining a security rating can be used in the forecasting of security ratings for an entity. Any scale or spectrum can be used to convey a security rating. For example, the scale can be a numerical scale or letter-based scale. The exemplary scale discussed in the following examples ranges from 300 to 800, is for the purpose of illustration, and is not intended to be limiting.

In some embodiments, the simulated instantiations of a security scenario may depend on or be more common depending on the type of entity or entity's industry. For example, for an entity such as a news organization, the system can simulate a security scenario in which the news organization is subject to one or more security events including denial-of-service attacks and malvertising. In some embodiments, the simulated instantiations of a security scenario may depend on a historical record of the entity. For example, if a software providing entity has a history of delaying patching of its software, the system may simulate a security scenario in which the software provider is subject to exploits of the unpatched software. In an exemplary embodiment, the parameters of distributions used in determined rate, duration, and/or temporal placement can depend on the historical record of the entity. For example, a normal distribution may be selected for the duration of an event. The mean and/or standard deviation of the distribution may be selected based on the historical record of the entity.

In some embodiments, in determining weights can be assigned to security events based on historical observations related to the entity. In some embodiments, a user of the system can determine the weights assigned to security events. For example, the banking industry as a whole may be more prone to a type of security event (e.g., phishing), which may cause that security event type to be weighted more in the determining of the security rating for that type of entity. However, if a particular entity of the same type (i.e., a particular bank) has a good track record of preventing phishing, then phishing as a security event may be weighted less.

In some embodiments, determining a security rating for an entity can include generating a ratings time series for the instantiation of the security scenario. Specifically, a security rating can be determined at consecutive or intermittent time points, resulting in a ratings time series for the instantiation. The ratings time series can form a security forecast for the instantiation of the security scenario.

In step 106, the system generates a forecast cone based on the determined security ratings for the plurality of instantiations. As discussed above, by determining a security ratings of instantiations, a corresponding set of security forecasts are generated. In some embodiments, all of the set of generated security forecasts are used to form a security forecast cone. In some embodiments, a subset of the security forecasts are used to generate the forecast cone.

In some embodiments, generating the forecast cone includes considering a subset of the security forecasts. In some embodiments, an inner band of the forecast cone can be based on an inner subset that is a first subset of the security forecasts and an outer band of the forecast cone can be based on the outer subset that is a second subset of the security forecasts. In some embodiments, the second subset overlaps with the first subset. In some embodiments, the second subset encompasses the first subset. For example, the inner subset may include those forecasts in the $25^{th}$ to $75^{th}$ percentile of the overall number of generated security forecasts. The outer subset may include those forecasts in the $5^{th}$ to $95^{th}$ percentile of the overall number of generated security forecasts. It is understood that the inner subset may include other percentile ranges, e.g., $20^{th}$ to $80^{th}$ percentile or $30^{th}$ to $70^{th}$ percentile. The outer subset may include other percentile ranges, e.g., $10^{th}$ to $90^{th}$ percentile or $3^{rd}$ to $97^{th}$ percentile. In some embodiments, a window function (e.g., a 15 day boxcar window, a 30 day boxcar window, etc.) may be used to produce a visually smoother forecast cone (e.g., similar to those illustrated in FIGS. 2B, 2D, 3B, and 3D).

Security Ratings Forecast Examples

Figure 2A:
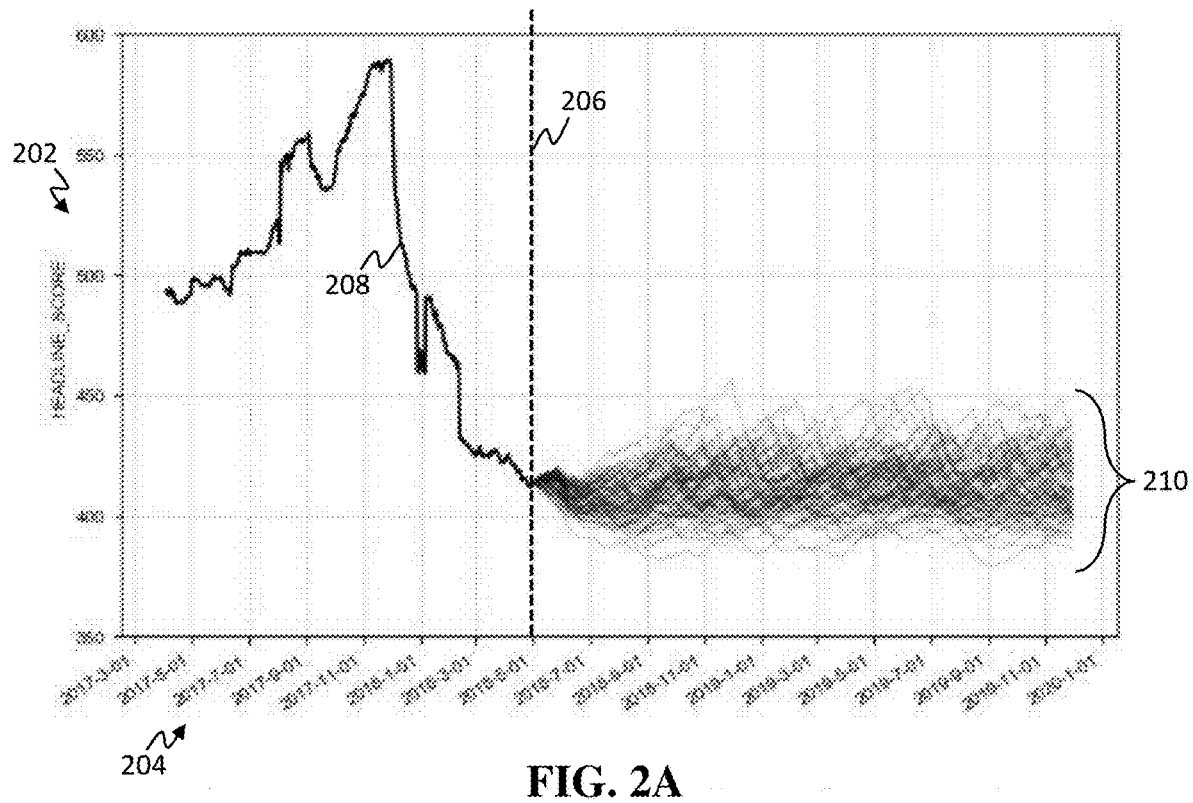
FIG. 2A is a plot of an exemplary set of security ratings forecasts for an entity as a function of date on a ratings scale.
Figure 2B:
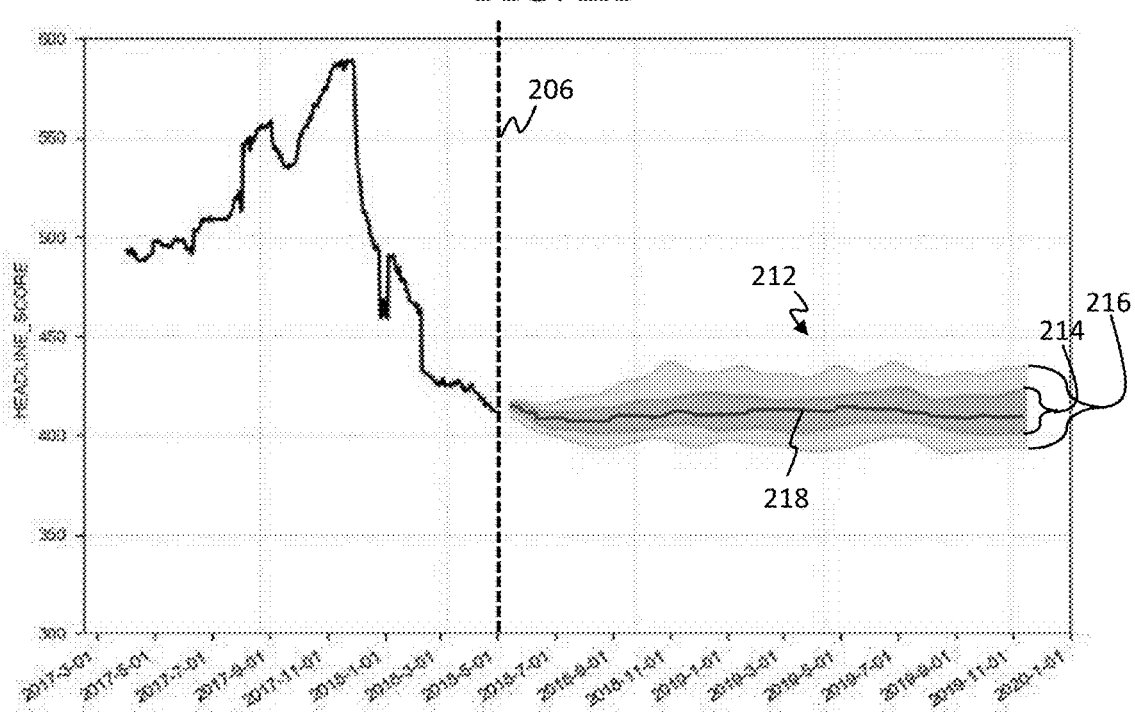
FIG. 2B is a plot of an exemplary security ratings forecast cone for the entity of FIG. 2A.
Figure 2C:
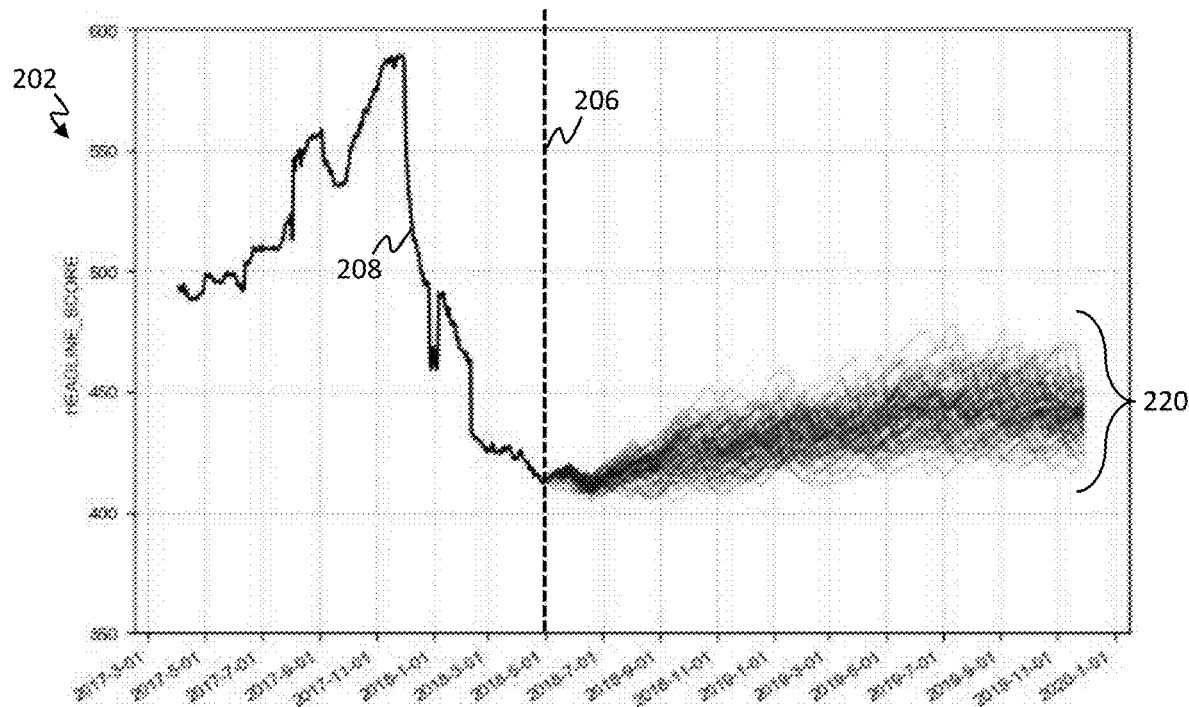
FIG. 2C is a plot of an exemplary set of security ratings forecasts for an entity as a function of date on a ratings scale.
Figure 2D:
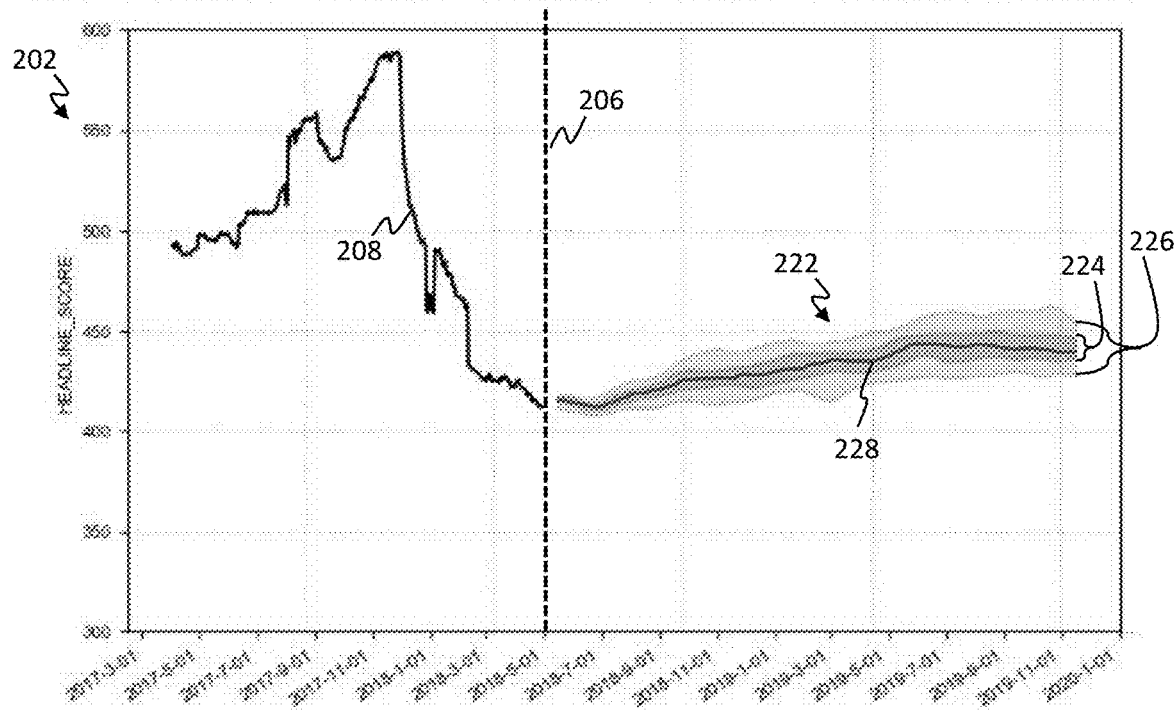
FIG. 2D is a plot of an exemplary security ratings forecast cone for the entity of FIG. 2C.

In the examples illustrated in FIG. 2A and FIG. 2C, one hundred (100) security forecasts were generated using the techniques described herein. FIG. 2A is a plot of an exemplary set of security ratings forecasts for Entity A as a function of date 204 on a ratings scale 202. Before time 206, the plot illustrates security ratings 208 based on actual collected data of past security events. After time 206, the plot includes a set of forecasts 210 of security ratings from time 206 into the future. Note that time 206 can be present time or another time that may, for example, depend on user selection. In the specific example illustrated in FIG. 2A, the security forecasts 210 span from May 1, 2018 to Jan. 1, 2020 and the security ratings 202 of the forecasts 210 range from approximately a score of 375 to 460.

The plot of FIG. 2B illustrates a security forecast cone 212 for the security scenario illustrated in FIG. 2A. In some embodiments, the security forecast cone 212 has an inner band 214 and outer band 216. Note that the inner band 214 and outer band 216 represent subsets of the full set of security forecasts of FIG. 2A. In some embodiments, the forecast cone 212 can include a line 218 representing the median (e.g., at the $50^{th}$ percentile) of the forecast cone 212.

Note that, in the example provided in FIG. 2A, the security scenario for Entity A includes the same or similar security event rate as the previous year. In the example provided in FIG. 2C, the security scenario does not incorporate new security events after time. Thus, the security forecasts 220 have security ratings (between 400 and 475) that are greater than that of security forecasts 210 (between 375 and 460). Likewise, security forecast cone 212 has a lower average security rating relative to the security forecast cone 222. Therefore, inner band 214 has a lower average security rating relative to inner band 224 and outer band 216 has a lower average security rating relative to outer band 226. In exemplary forecast cone 222, the median is represented by line 228. In the examples illustrated in FIGS. 2B and 2D, a 30-day boxcar window was used to create the forecast cone.

Figure 3A:
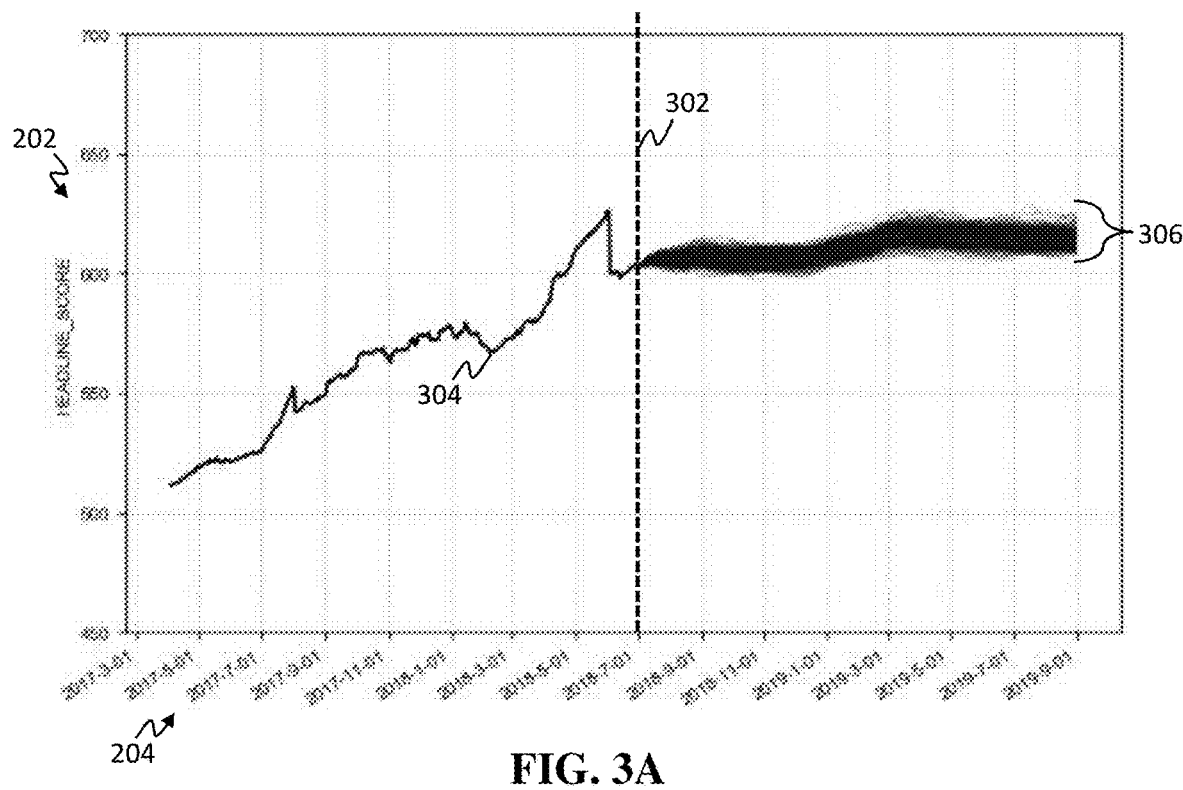
FIG. 3A is a plot of an exemplary set of security ratings forecasts for an entity as a function of date on a ratings scale.
Figure 3B:
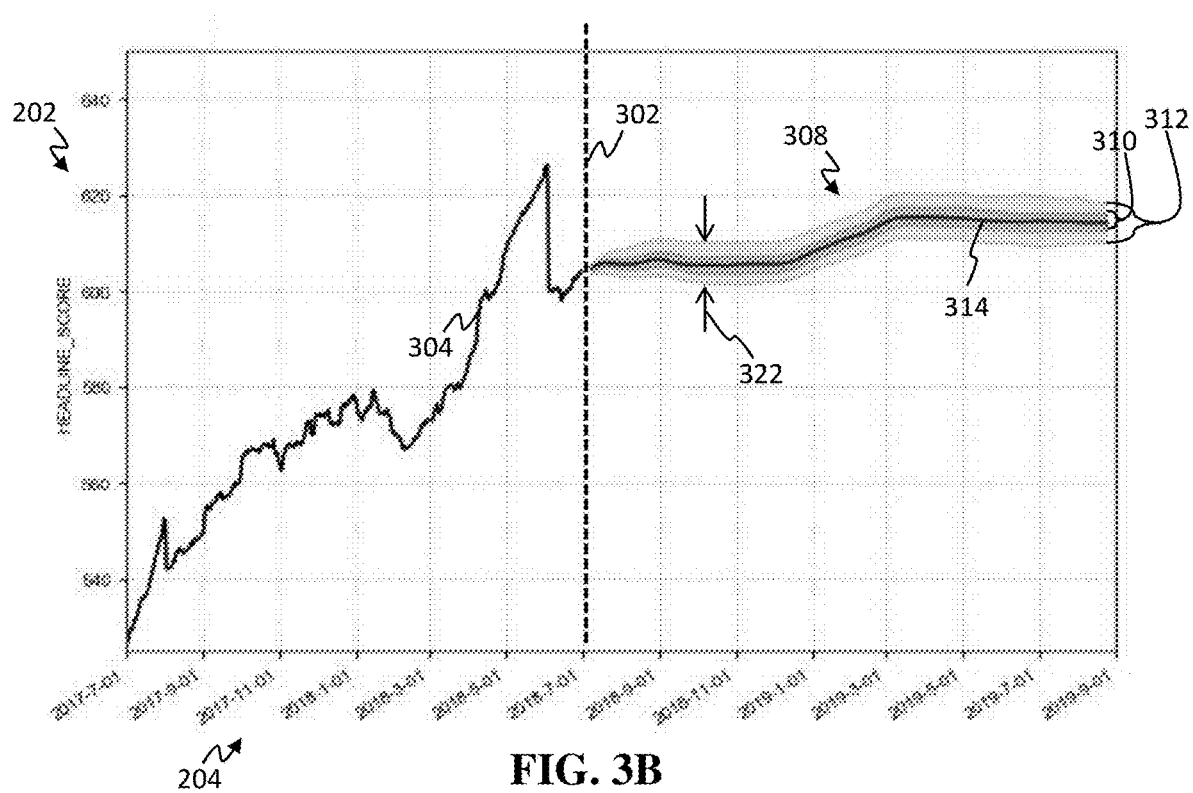
FIG. 3B is a plot of an exemplary security ratings forecast cone for the entity of FIG. 3A.
Figure 3C:
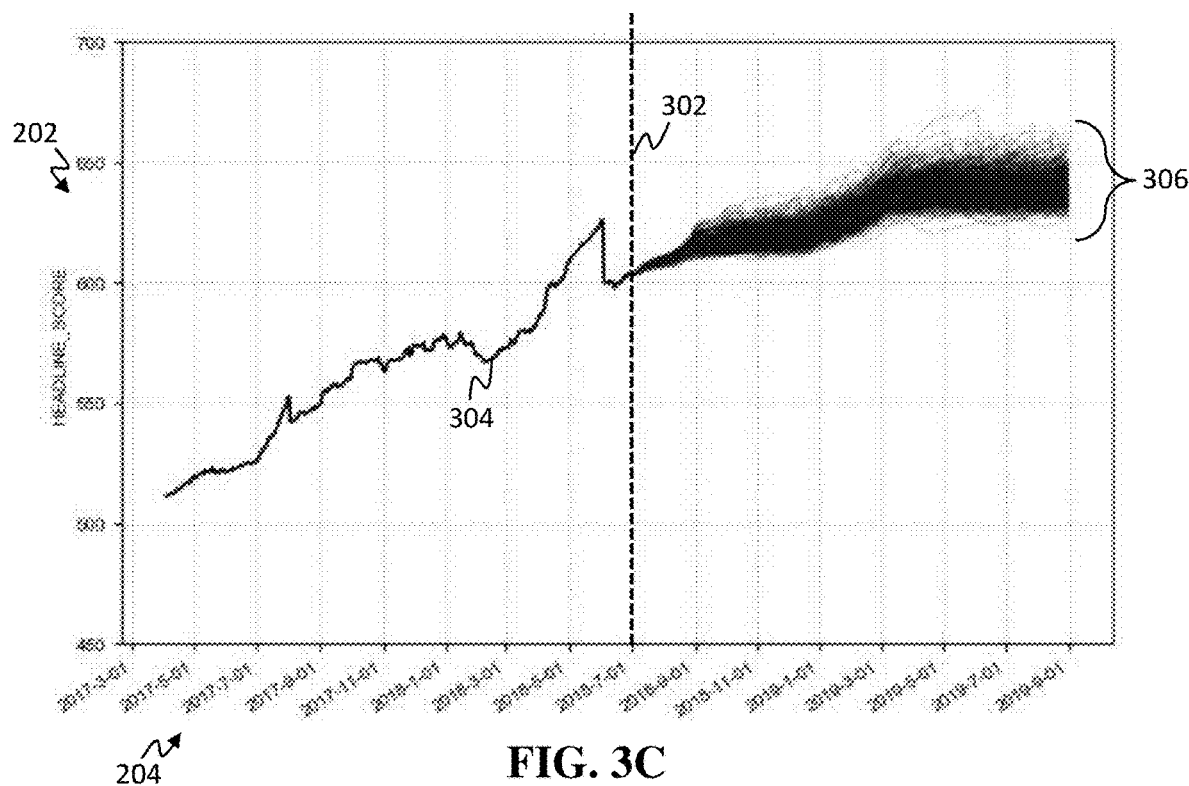
FIG. 3C is a plot of an exemplary set of security ratings forecasts for an entity as a function of date on a ratings scale.
Figure 3D:
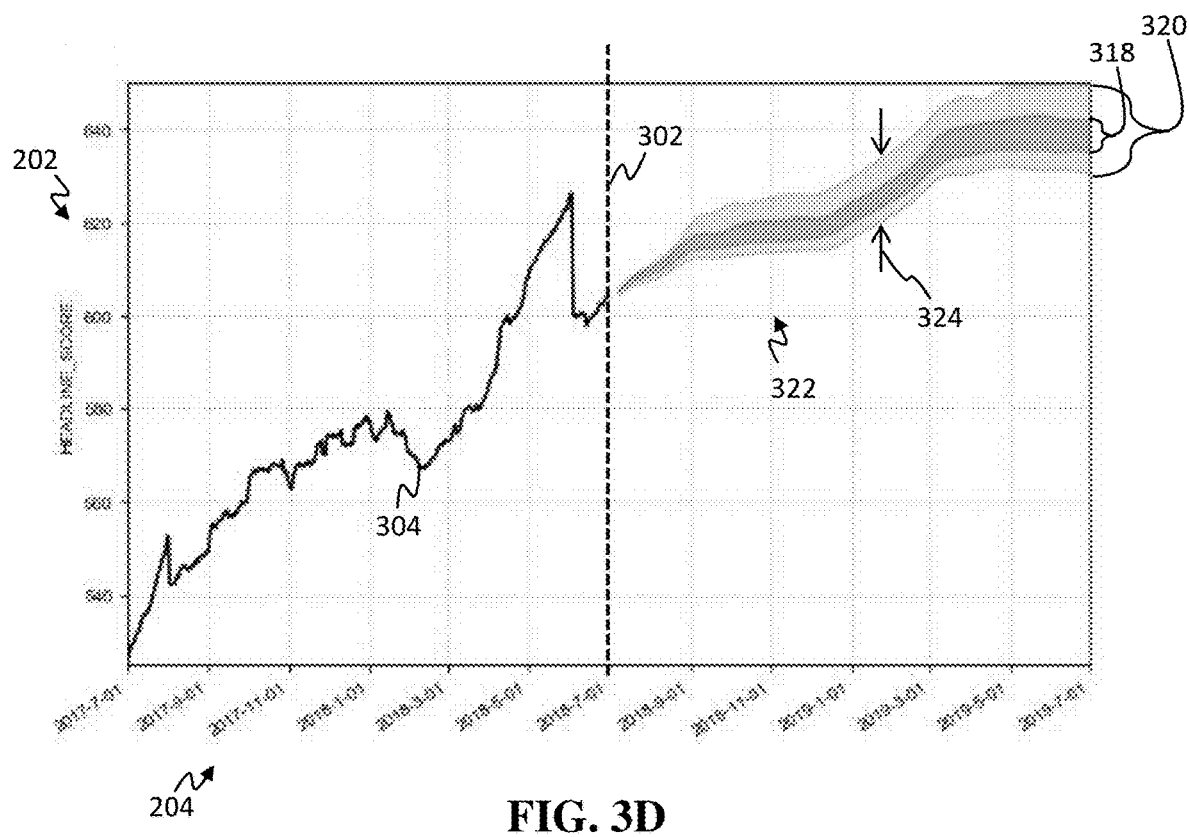
FIG. 3D is a plot of an exemplary security ratings forecast cone for the entity of FIG. 3C.

In the examples illustrated in FIG. 3A and FIG. 3C, five hundred (500) security forecasts were generated using the techniques described herein. FIG. 3A is a plot of an exemplary set of security ratings forecasts for Entity B as a function of date 204 on a ratings scale 202. Before time 302, the plot illustrates security ratings 304 based on actual collected data of past security events. After time 302, the plot includes a set of forecasts 306 of security ratings from time 302 into the future. Note that time 302 can be present time or another time that may, for example, depend on user selection. In the specific example illustrated in FIG. 3A, the forecasts 306 span from Jul. 1, 2018 to Sep. 1, 2019 and the security ratings 202 of the forecasts 306 range from approximately a score of 590 to 630.

The plot of FIG. 3B illustrates a security forecast cone 308 for the security scenario illustrated in FIG. 3A. In some embodiments, the security forecast cone 308 has an inner band 310 and outer band 312. Note that the inner band 310 and outer band 312 represent subsets of the full set of security forecasts of FIG. 3A. The median of the exemplary forecast cone 308 is represented by line 314.

Note that, in the example provided in FIG. 3A, the security scenario for Entity B includes the same or similar security event rate as the previous year. In the example provided in FIG. 3C, the security scenario includes the same or similar security event rate as the previous month. In this example, the security ratings in the previous month are greater in general than the security ratings in the previous year. Thus, the security forecasts 316 have security ratings (between 600 and 675) that are greater than that of security forecasts 306 (between 590 and 630). Likewise, security forecast cone 308 has a lower average security rating relative to the security forecast cone 316. Therefore, inner band 310 has a lower average security rating relative to inner band 318 and outer band 312 has a lower average security rating relative to outer band 320. In the examples illustrated in FIGS. 3B and 3D, a 15-day boxcar window was used to create the forecast cone.

In some embodiments, some forecast cones have a greater spread over security rating than other forecast cones. For example, forecast cone 308 has a spread 322 that is less than the spread 324. One factor in the different spreads of the cones is the decay rate of past security events of a given event types. In a preferred embodiment, the decay rate may be non-linear (e.g., exponential, logarithmic, etc.). For example, the security event type of file sharing may have a greater decay rate than that of botnet infections.

User Interfaces for Security Ratings Forecasts

Figure 4A:
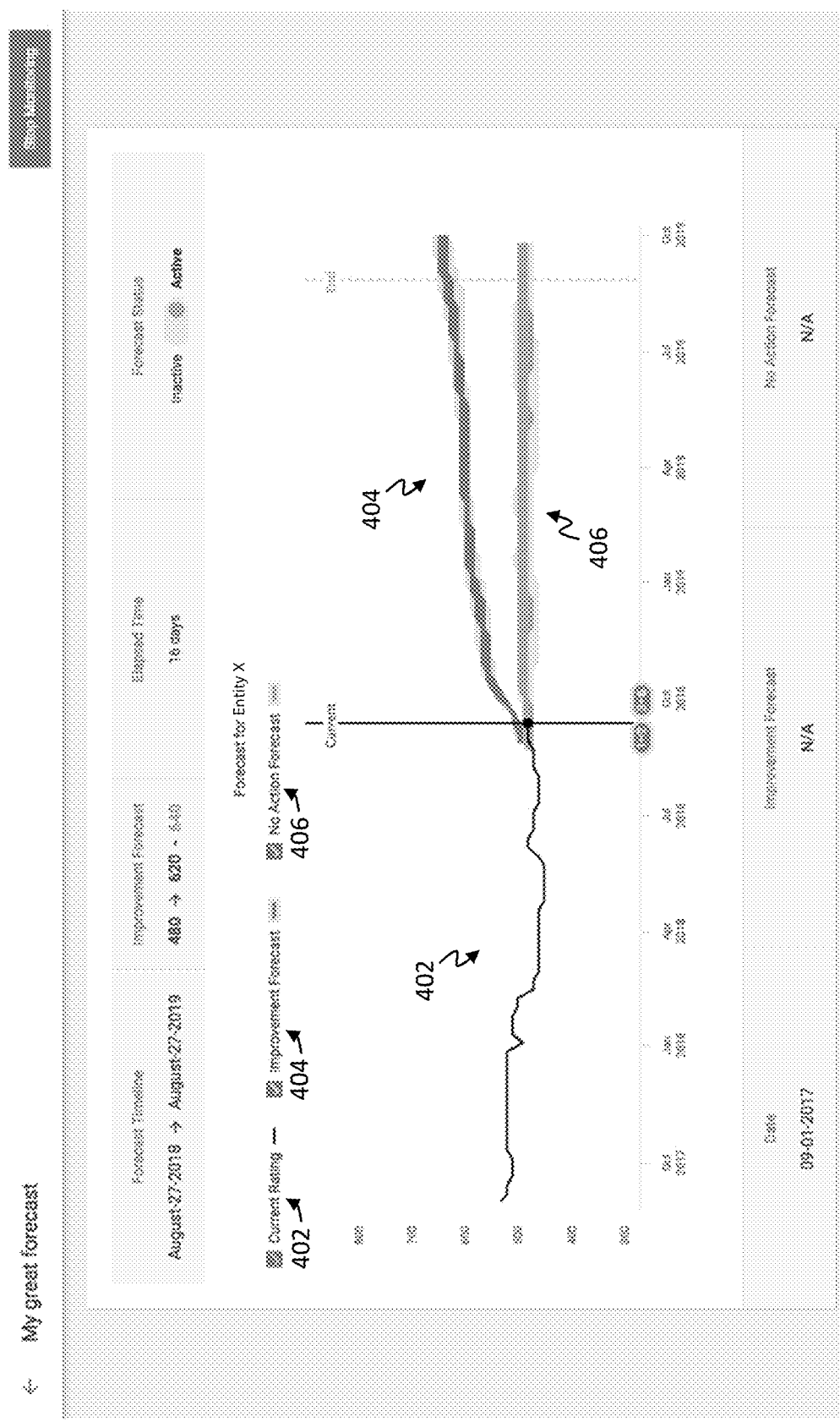
FIGS. 4A-4C illustrate an exemplary user interface for forecasting security ratings for an entity.
Figure 4B:
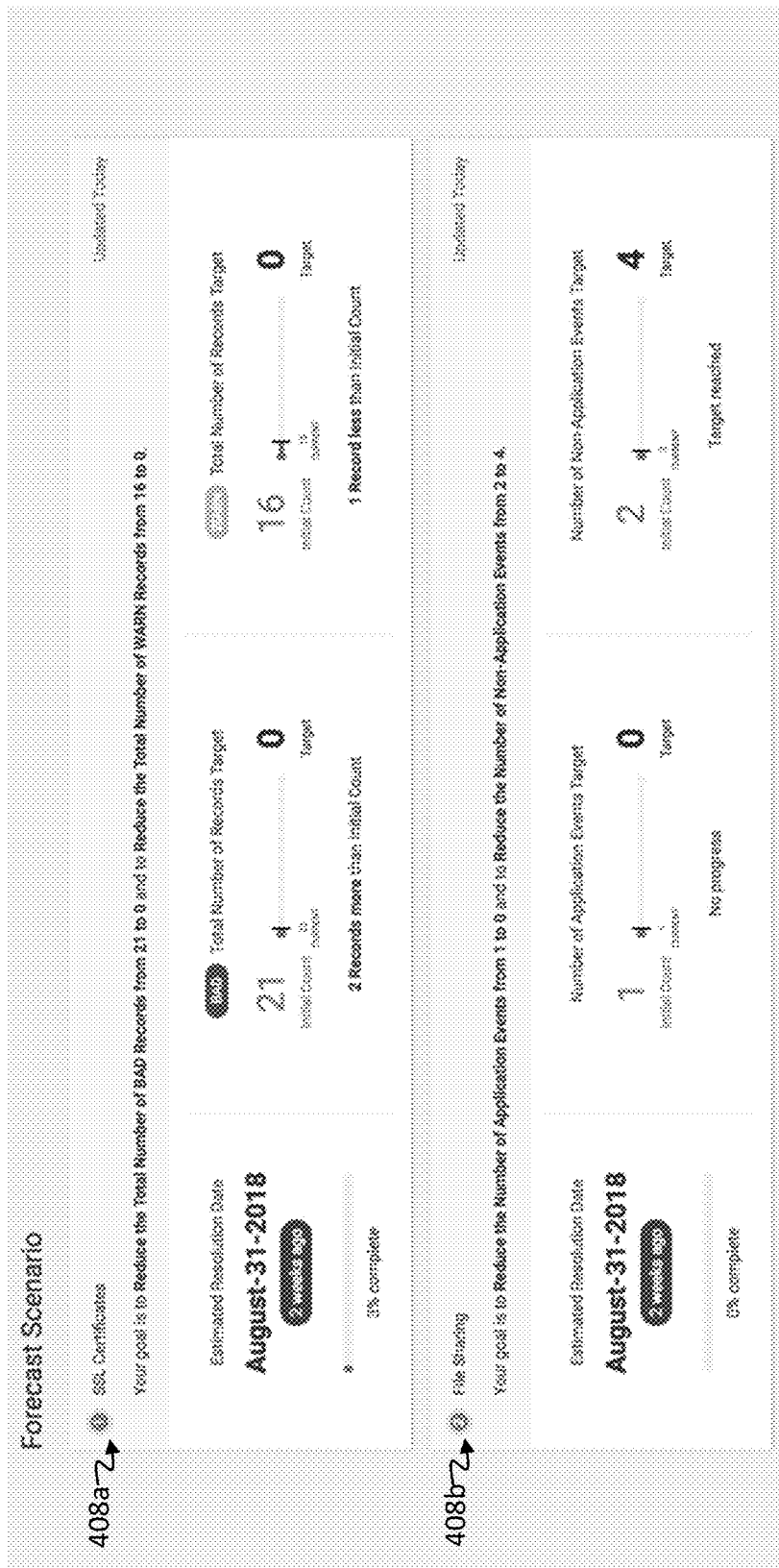
Figure 4C:
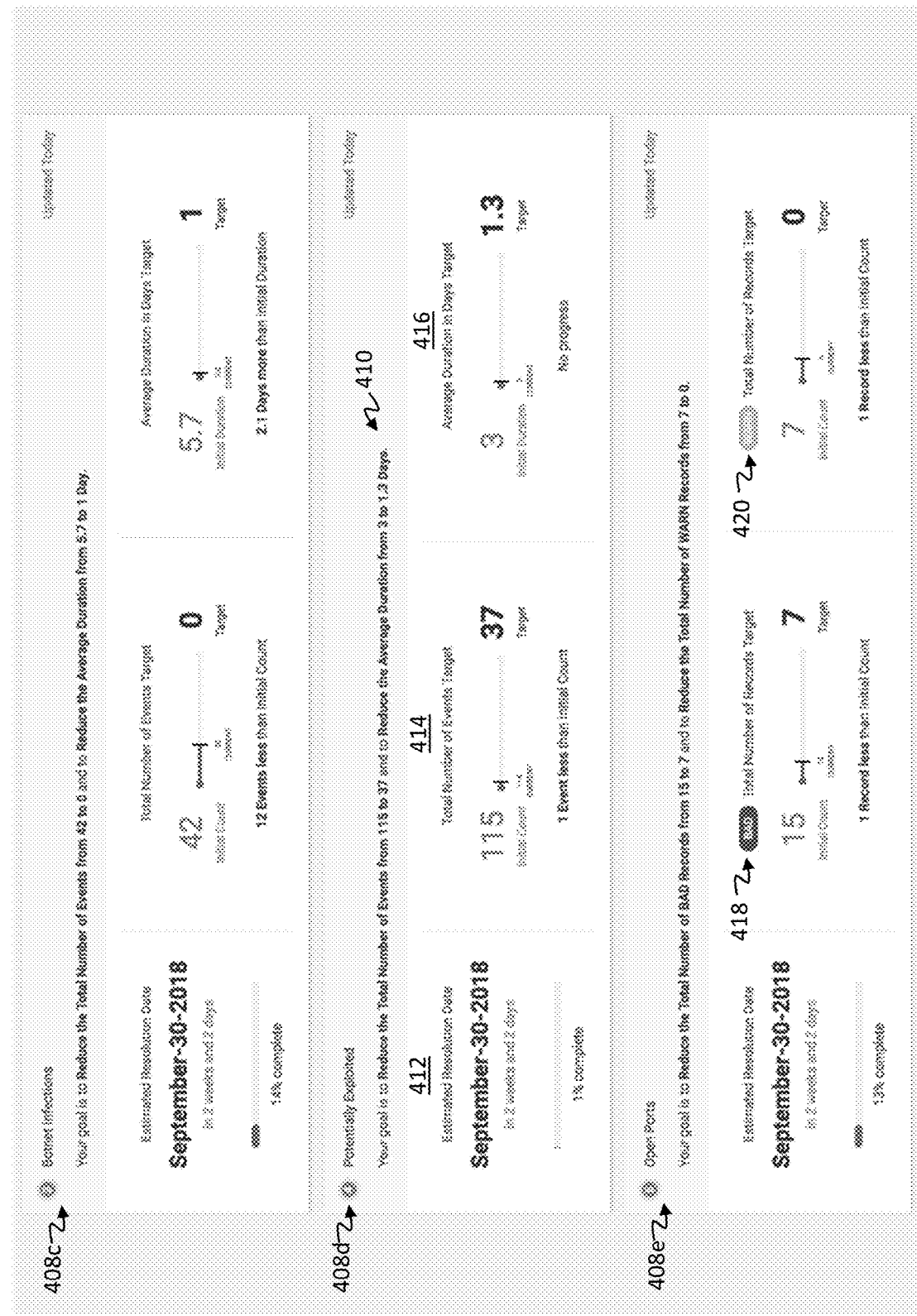

FIGS. 4A-4C illustrate an exemplary user interface for forecasting security ratings for an entity ("Entity X"). The user of the user interface may be a representative of the entity itself, a representative of an insurance agency of the entity, a representative of a third party that has some business relationship to the entity, a governmental regulator, etc. FIG. 4A illustrates a first portion 400a of the interface, in which an interactive plot depicts past security ratings 402 and two forecasted security ratings 404, 406. The "improvement" forecast 404 is the result of improvements to the security ratings of the entity by, for example, reducing or preventing security events in the forecasting period (e.g., from approximately September 2017 to approximately October 2019). The "no action" forecast 406 is the result of no reduction or prevention of security events in the forecasting period. Note that the "improvement" forecast 404 shows a visibly significant improvement in security ratings over the "no action" forecast 406.

FIGS. 4B-4C illustrate a second portion 400b and a third portion 400c of the interface in which a security scenario of specific event types are displayed in event type panels (collectively referred to as panels "408"). The event type panels 408 include panel 408a (labelled "SSL Certificates") which includes information on the number of records indicating insecure certificates; panel 408b (labelled "File Sharing") which includes information on the number of application and non-application file sharing events; panel 408c (labelled "Botnet Infections") which includes information on the number of botnet attack or activity events and related duration; panel 408d (labelled "Potentially Exploited") which includes information on the number of potentially unwanted applications running on computers associated with the entity; and panel 408e (labelled "Open Ports") which includes information on ports exposed to the Internet. For example, event type panel 408d labelled "Potentially Exploited" describe security events in which the entity's computers may be running potentially unwanted applications. Unwanted applications may allow harmful malware to compromise or take control of the entity's computer systems. The event type panel 408d displays information for the user of the user interface goals for reducing the security event of the particular type (in this example, potential exploitations) and quantitative measures of a status of the entity reaching that goal. Specifically, the system generates a goal 410 based on the historical record of the entity. For example, the goal 410 for reducing botnet infections are as follows:

Your goal is to Reduce the Total Number of Events from 115 to 37
and
to Reduce the Average Duration from 3 to 1.3 days.

In the illustrated embodiment 408d, a first subpanel 412 illustrates the prediction of an estimated resolution date of reducing the number of security events of this type for this entity. In a second subpanel 414, an initial total number of events is represented on a scale to the target number of events for Entity X. In this example, there is an initial count of 115 potential exploitation events for Entity X with a current count of 114 and a target number 37 events. In a third subpanel 416, the initial average duration of the security event is represented on a scale to the target average duration of the security event in days. In this example, potential exploitations have a duration of an average of 3 days initially for Entity X with a current duration of 3 days and a target of 1.3 days. In some embodiments of the open ports panel 408e, an indicator 418 such as "BAD", "WARN", or "GOOD" may be displayed to give a quick visual indication to the user the type of open ports associated with the goal. For example, in panel 408e, the center subpanel has an indicator 418 labelled "BAD" to indicate that the "bad"-type open ports should be reduced from 15 to 7 while the right-hand panel includes an indicator 420 labelled "WARN" to indicate that the "warn"-type open ports should be reduced from 7 to 0.

Note that the user interface illustrating other security scenarios may include other event type panels (or have fewer or greater number of panels). In the example provided in FIGS. 4A-4C, the security scenario included five event types (in panels 408a-408e) in generating forecast in FIG. 4A. In some embodiments, in generating the security scenario, other event types may be held "constant"; in other words, other security events (e.g., spam propagation, malware, etc.) may be assumed to be continuing at a historical rate, duration, and/or temporal placement for the particular entity.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 5:
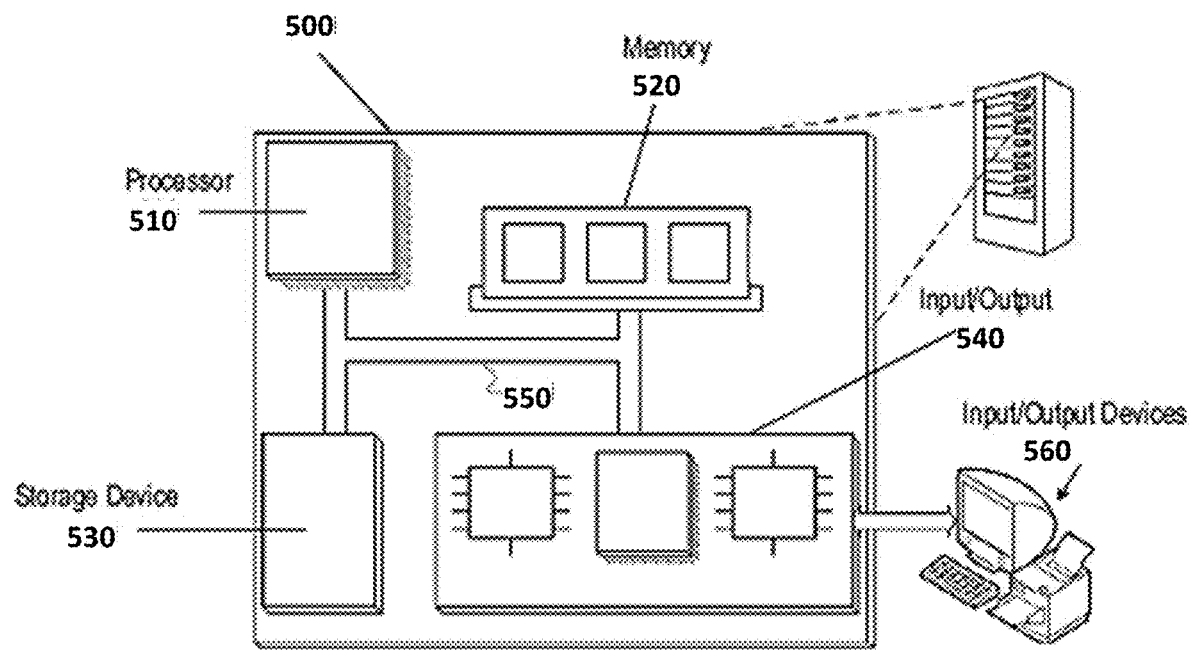
FIG. 5 is a block diagram of an example computer system that may be used in implementing the technology described herein.

FIG. 5 is a block diagram of an example computer system 500 that may be used in implementing the technology described in this document. General-purpose computers, network appliances, mobile devices, or other electronic systems may also include at least portions of the system 500. The system 500 includes a processor 510, a memory 520, a storage device 530, and an input/output device 540. Each of the components 510, 520, 530, and 540 may be interconnected, for example, using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530.

The memory 520 stores information within the system 500. In some implementations, the memory 520 is a non-transitory computer-readable medium. In some implementations, the memory 520 is a volatile memory unit. In some implementations, the memory 520 is a non-volatile memory unit.

The storage device 530 is capable of providing mass storage for the system 500. In some implementations, the storage device 530 is a non-transitory computer-readable medium. In various different implementations, the storage device 530 may include, for example, a hard disk device, an optical disk device, a solid-date drive, a flash drive, or some other large capacity storage device. For example, the storage device may store long-term data (e.g., database data, file system data, etc.). The input/output device 540 provides input/output operations for the system 500. In some implementations, the input/output device 540 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 560. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 530 may be implemented in a distributed way over a network, such as a server farm or a set of widely distributed servers, or may be implemented in a single computing device.

Although an example processing system has been described in FIG. 5, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computer-implemented method for forecasting security ratings for an entity, the method comprising:
    generating a plurality of simulated instantiations of a security scenario for the entity, the security scenario characterized by a plurality of security events associated with at least one event type;
    determining a security rating for each instantiation of the plurality of instantiations, wherein determining the security rating comprises assigning weights to security events of each event type based on (i) historical observations related to the entity and (ii) an industry associated with the entity;
    generating a security forecast for each instantiation based at least in part on the determined security rating for the respective instantiation; and
    generating a forecast cone based at least in part on the determined security ratings for the plurality of instantiations, wherein the generated forecast cone comprises an inner band based on a first, inner subset of the generated security forecasts and an outer band based on a second, outer subset of the generated security forecasts.

2. The method of claim 1, wherein generating the plurality of simulated instantiations of the security scenario for the entity comprises:
    for each event type of the at least one event type:
        determining a rate of the security events associated with the event type over a forecasting period;
        determining a duration of the security events associated with the event type in the forecasting period; and
        determining a temporal placement of the security events associated with the event type in the forecasting period.

3. The method of claim 2, wherein determining the rate of the security events associated with the event type over the forecasting period comprises:
    sampling from a distribution to determine the rate of the security events associated with the event type.

4. The method of claim 3, wherein the distribution is selected from the group consisting of: a normal distribution, a log-normal distribution, a geometric distribution, a Poisson distribution, and a uniform distribution.

5. The method of claim 2, wherein determining the duration of the security events associated with the event type in the forecasting period comprises:
    sampling from a distribution to determine the duration of the security events associated with the event type.

6. The method of claim 5, wherein the distribution is selected from the group consisting of: a normal distribution, a log-normal distribution, a geometric distribution, a Poisson distribution, and a uniform distribution.

7. The method of claim 2, wherein determining the temporal placement of the security events associated with the event type in the forecasting period comprises:
    sampling from a distribution to determine the temporal placement of the security events associated with the event type.

8. The method of claim 7, wherein the distribution is selected from the group consisting of: a normal distribution, a log-normal distribution, a geometric distribution, a Poisson distribution, and a uniform distribution.

9. The method of claim 1, wherein determining the security rating for each instantiation of the plurality of instantiations comprises:
    generating a ratings time series for the instantiation, the ratings time series forming the security forecast for the instantiation.

10. The method of claim 1, wherein the inner band of the forecast cone is based on a 25th percentile and a 75th percentile of the subset of the security forecasts and the outer band of the forecast cone is based on a 5th percentile and 95th percentile of the subset of security forecasts.

11. The method of claim 1, further comprising:
providing, to a user interface, the generated subset of the generated security forecasts for display.

12. The method of claim 1, wherein determining the security rating further comprises assigning weights to security events of each event type based on a user input.

13. A system for forecasting security ratings for an entity, the system comprising:
at least one memory storing computer-executable instructions; and
at least one processor for executing the instructions storing on the memory, wherein execution of the instructions programs the at least one processor to perform operations comprising:
generating a plurality of simulated instantiations of a security scenario for the entity, the security scenario characterized by a plurality of security events associated with at least one event type;
determining a security rating for each instantiation of the plurality of instantiations, wherein determining the security rating comprises assigning weights to security events of each event type based on: (i) historical observations related to the entity and (ii) an industry associated with the entity;
generating a security forecast for each instantiation based at least in part on the security rating for the respective instantiation; and
generating a forecast cone based at least in part on the determined security ratings for the plurality of instantiations, wherein the generated forecast cone comprises an inner band based on a first, inner subset of the generated security forecasts and an outer band based on a second, outer subset of the generated security forecasts.

14. The system of claim 13, wherein generating the plurality of simulated instantiations of the security scenario for the entity comprises:
for each event type of the at least one event type:
determining a rate of the security events associated with the event type over a forecasting period;
determining a duration of the security events associated with the event type in the forecasting period; and
determining a temporal placement of the security events associated with the event type in the forecasting period.

15. The system of claim 14, wherein determining the rate of the security events associated with the event type over the forecasting period comprises:
sampling from a distribution to determine the rate of the security events associated with the event type.

16. The system of claim 15, wherein the distribution is selected from the group consisting of: a normal distribution, a log-normal distribution, a geometric distribution, a Poisson distribution, and a uniform distribution.

17. The system of claim 14, wherein determining the duration of the security events associated with the event type in the forecasting period comprises:
sampling from a distribution to determine the duration of the security events associated with the event type.

18. The system of claim 17, wherein the distribution is selected from the group consisting of: a normal distribution, a log-normal distribution, a geometric distribution, a Poisson distribution, and a uniform distribution.

19. The system of claim 14, wherein determining the temporal placement of the security events associated with the event type in the forecasting period comprises:
sampling from a distribution to determine the temporal placement of the security events associated with the event type.

20. The system of claim 19, wherein the distribution is selected from the group consisting of: a normal distribution, a log-normal distribution, a geometric distribution, a Poisson distribution, and a uniform distribution.

21. The system of claim 13, wherein determining the security rating for each instantiation of the plurality of instantiations comprises:
generating a ratings time series for the instantiation, the ratings time series forming the security forecast for the instantiation.

22. The system of claim 13, wherein the inner band of the forecast cone is based on a 25th percentile and a 75th percentile of the subset of the security forecasts and the outer band of the forecast cone is based on a 5th percentile and a 95th percentile of the subset of security forecasts.

23. The system of claim 13, wherein the operations further comprise:
providing, to a user interface coupled to the processor, the generated subset of the generated security forecasts for display.

24. The system of claim 13, wherein determining the security rating further comprises assigning weights to security events of each event type based on a user input.

* * * * *